(12) United States Patent
Doody

(10) Patent No.: US 6,786,052 B2
(45) Date of Patent: Sep. 7, 2004

(54) INSULATION SYSTEM FOR A TURBINE AND METHOD

(75) Inventor: James Doody, Hamilton (CA)

(73) Assignee: 1419509 Ontario Inc., Burlington (CA)

( * ) Notice: Subject to any disclaimer, the term of this patent is extended or adjusted under 35 U.S.C. 154(b) by 130 days.

(21) Appl. No.: 10/313,813

(22) Filed: Dec. 6, 2002

(65) Prior Publication Data

US 2004/0109758 A1 Jun. 10, 2004

(51) Int. Cl.⁷ .................................................. F02G 7/20
(52) U.S. Cl. ........................... 60/796; 60/798; 60/799; 415/178; 415/177
(58) Field of Search ......................... 60/796, 798, 799; 415/177, 178

(56) References Cited

U.S. PATENT DOCUMENTS

| | | | | |
|---|---|---|---|---|
| 4,522,559 A | * | 6/1985 | Burge et al. ................ | 415/196 |
| 5,165,848 A | * | 11/1992 | Plemmons .................. | 415/177 |
| 5,174,714 A | * | 12/1992 | Plemmons et al. ......... | 415/177 |
| 5,176,495 A | * | 1/1993 | Honkomp et al. ......... | 415/173.1 |
| 5,195,868 A | * | 3/1993 | Plemmons et al. ......... | 415/177 |
| 5,269,651 A | * | 12/1993 | Ostermeir et al. ........ | 415/209.1 |
| 6,508,623 B1 | * | 1/2003 | Shiozaki et al. .......... | 415/173.1 |
| 6,652,228 B2 | * | 11/2003 | Tiemann ..................... | 415/178 |

* cited by examiner

*Primary Examiner*—Justine R. Yu
*Assistant Examiner*—William H. Rodriguez
(74) *Attorney, Agent, or Firm*—Patrick J. Hofbauer

(57) ABSTRACT

Turbine insulation is disclosed, and comprises blankets, ribs and coupling members. The blankets define, with the turbine, an annular channel in receipt of the turbine vertical joint and a pair of longitudinal channels each in receipt of a respective turbine horizontal joint. A pair of ribs are positioned in each longitudinal channel, in volume-filling relation thereto and overlapping the blankets disposed, respectively, fore and aft of the vertical joint. A pair of ribs are positioned in volume-filling relation to the annular channel and overlapping the blankets disposed, respectively, on the upper and lower arcuate portions of the housing. A coupling member is positioned in each longitudinal channel at its intersection with the annular channel, in volume-filling relation to a void defined by the housing and the ribs and in lapped relation to the ribs.

24 Claims, 25 Drawing Sheets

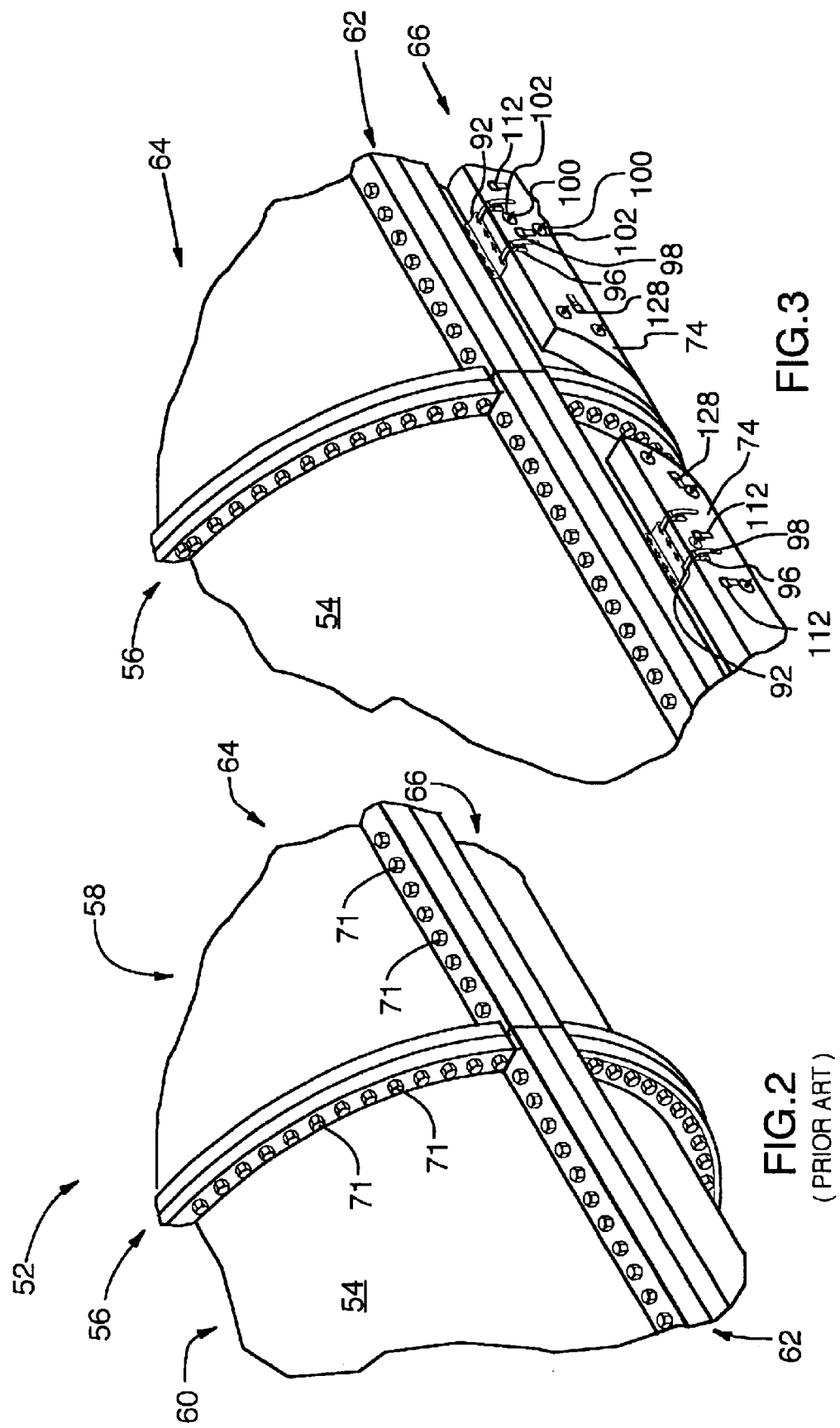

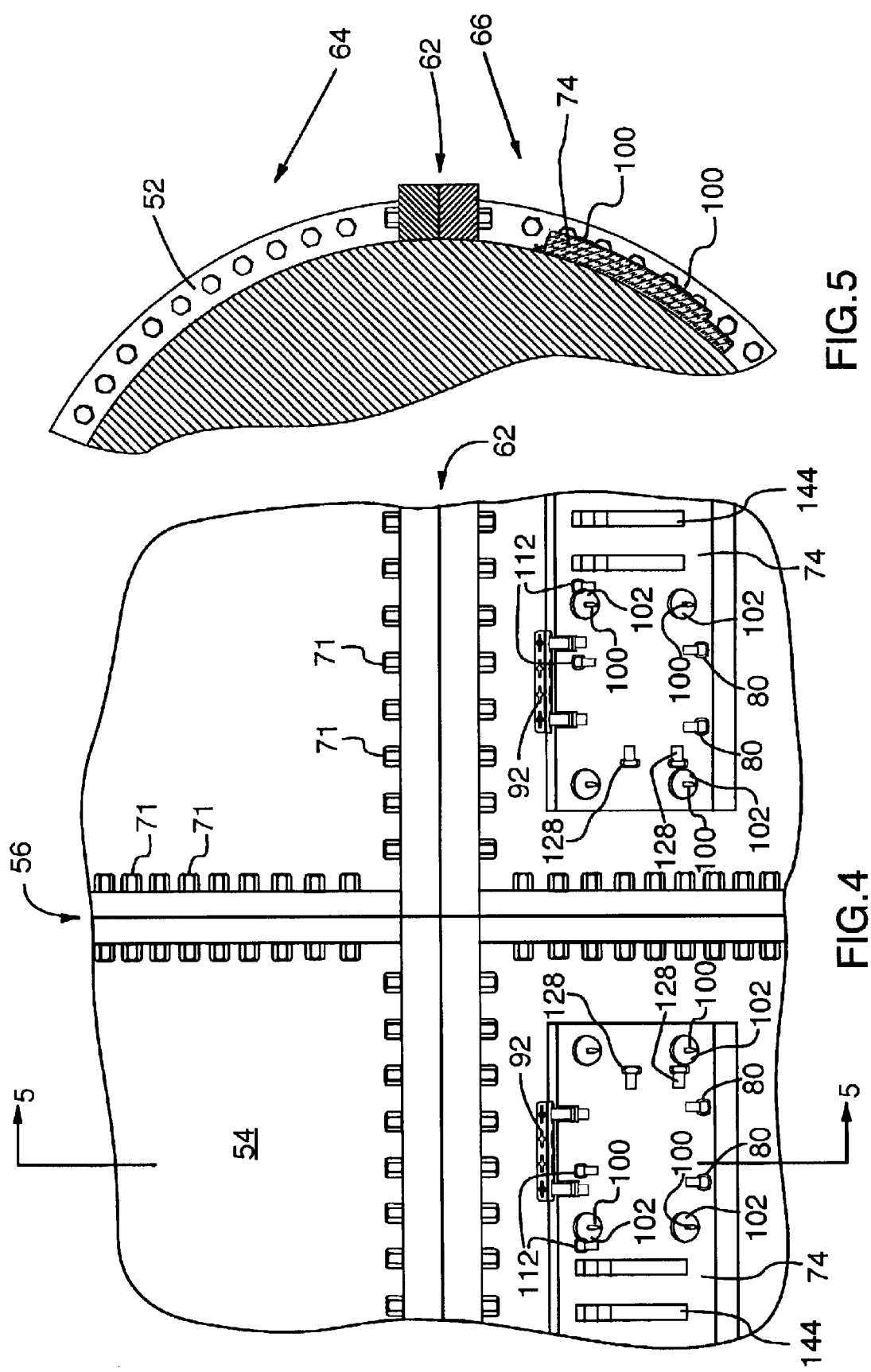

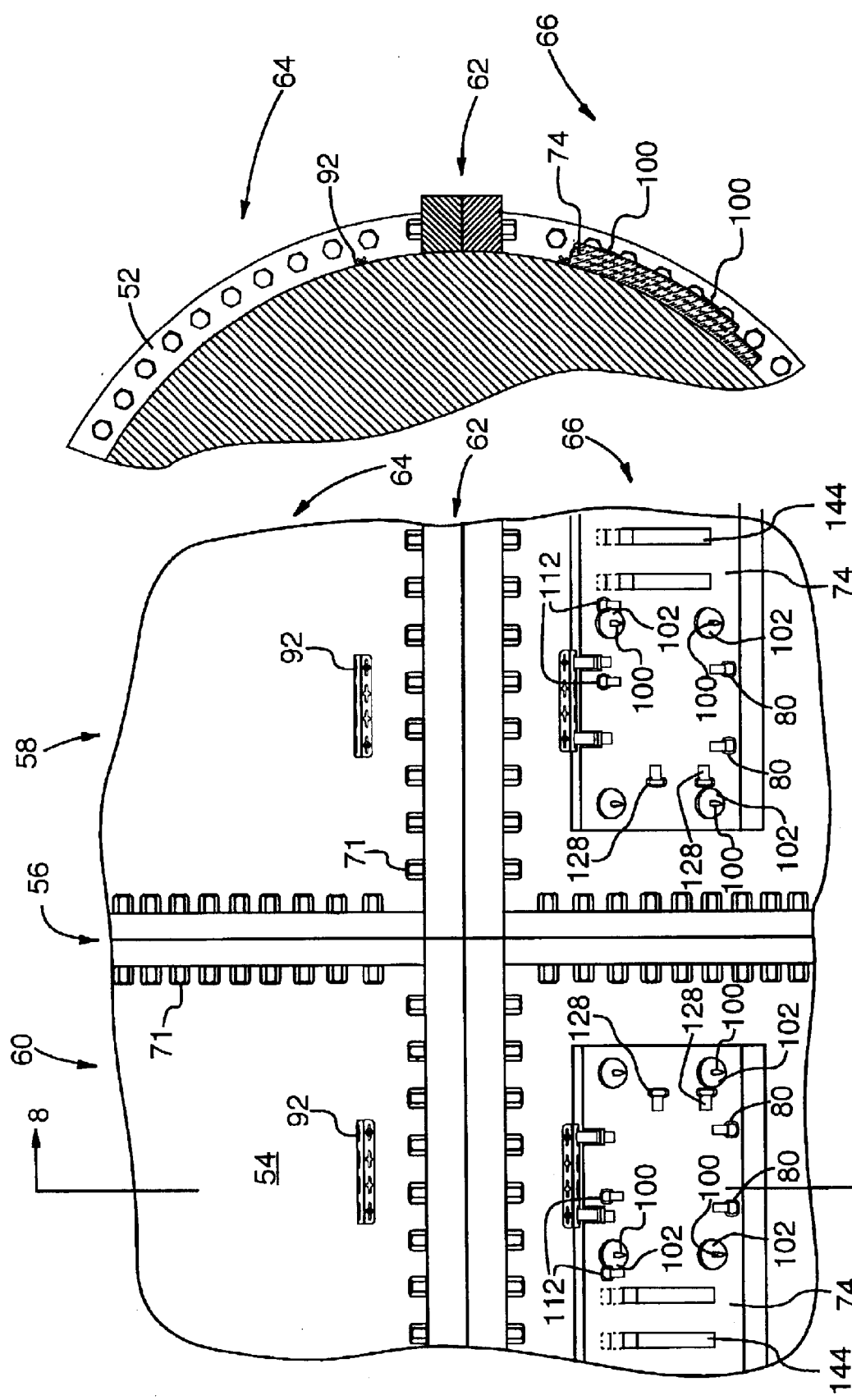

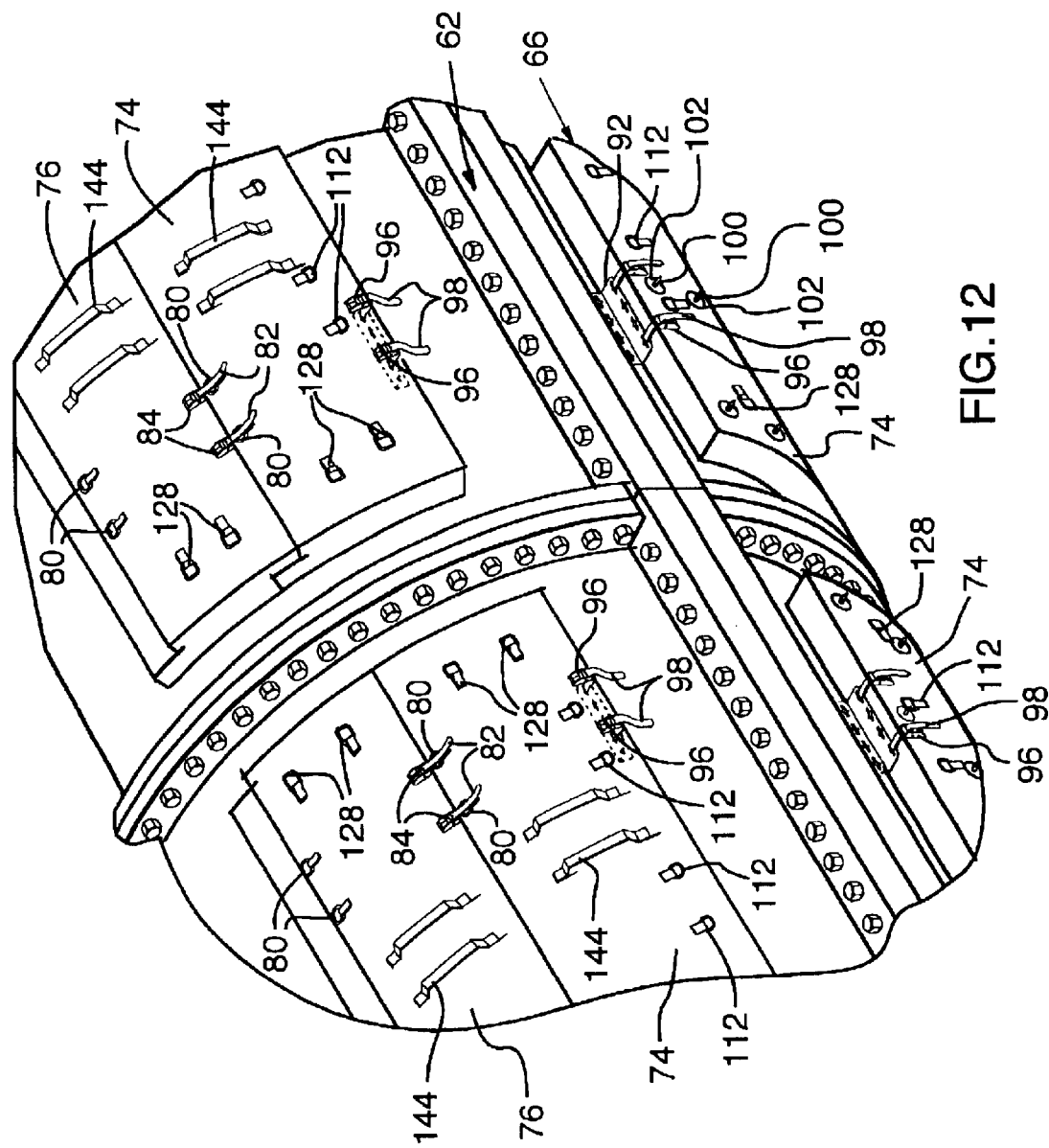

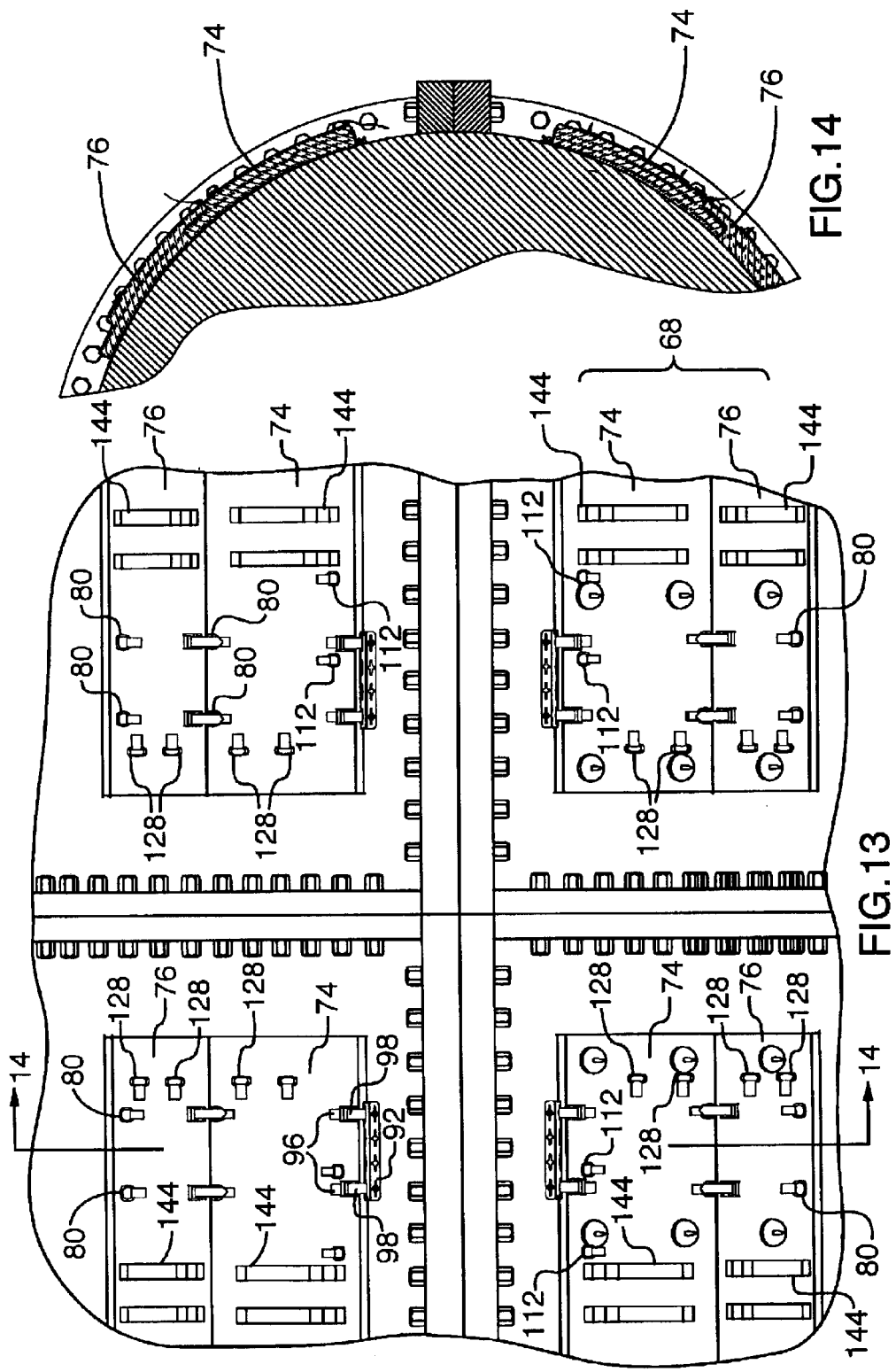

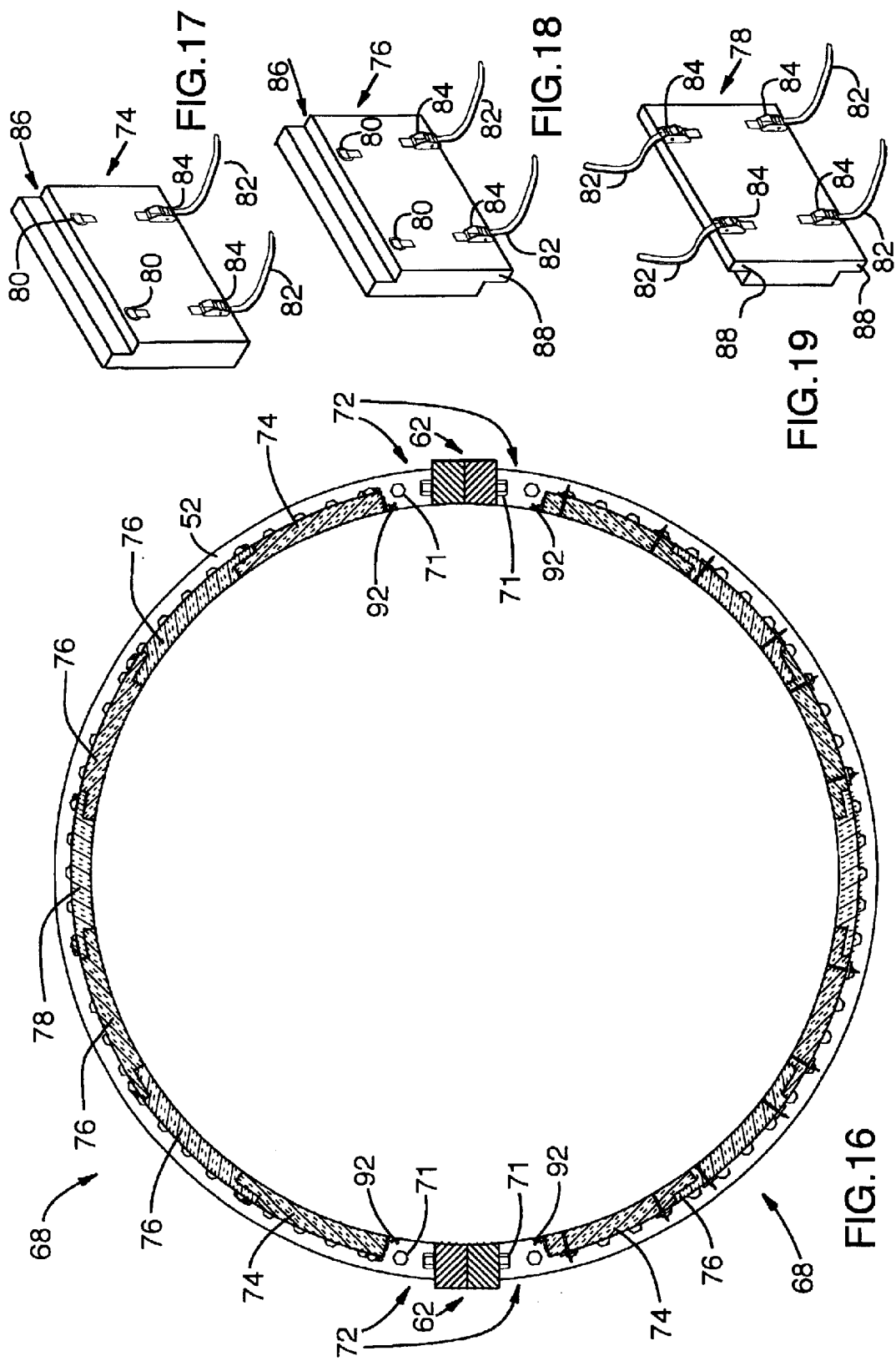

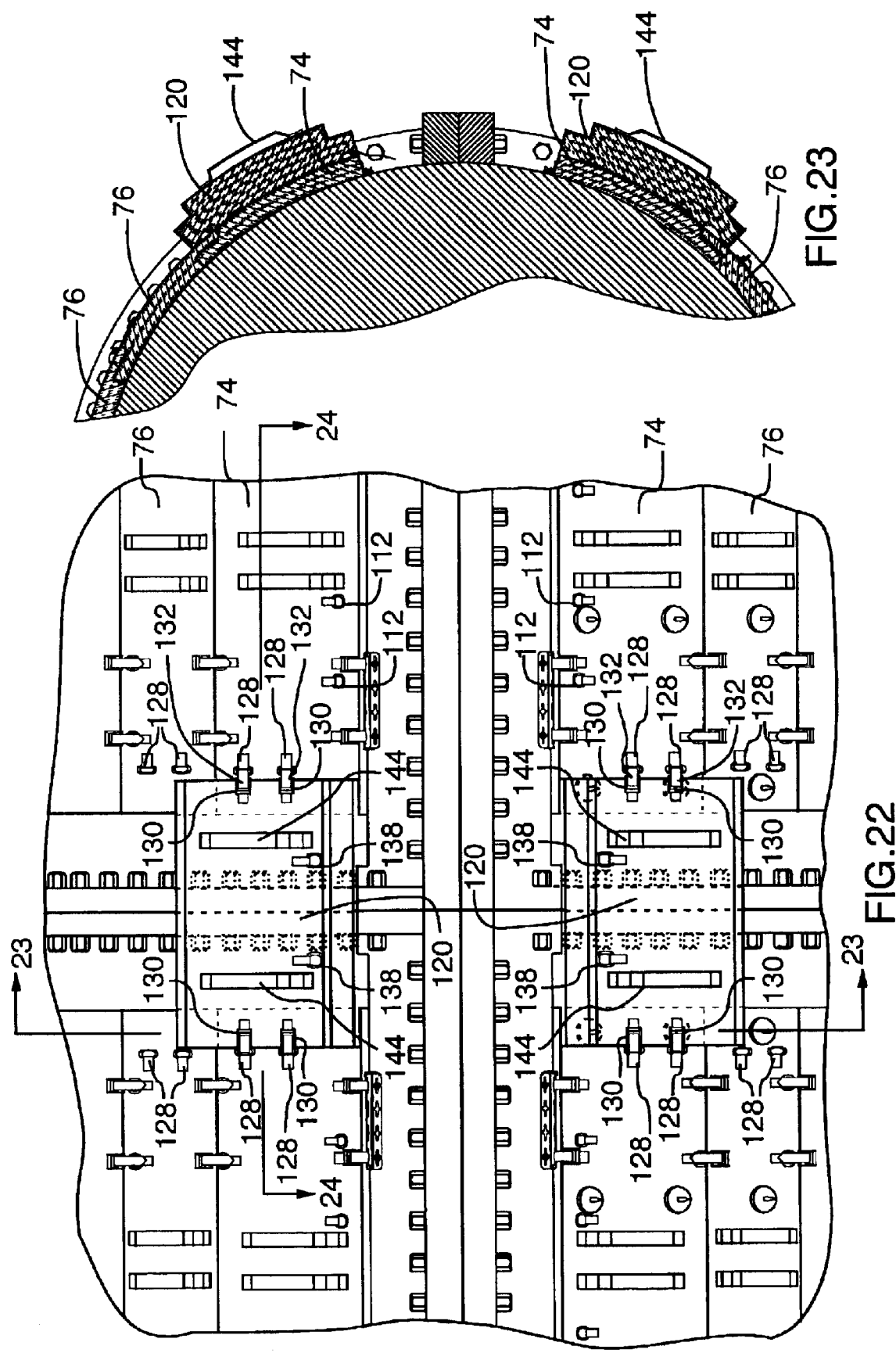

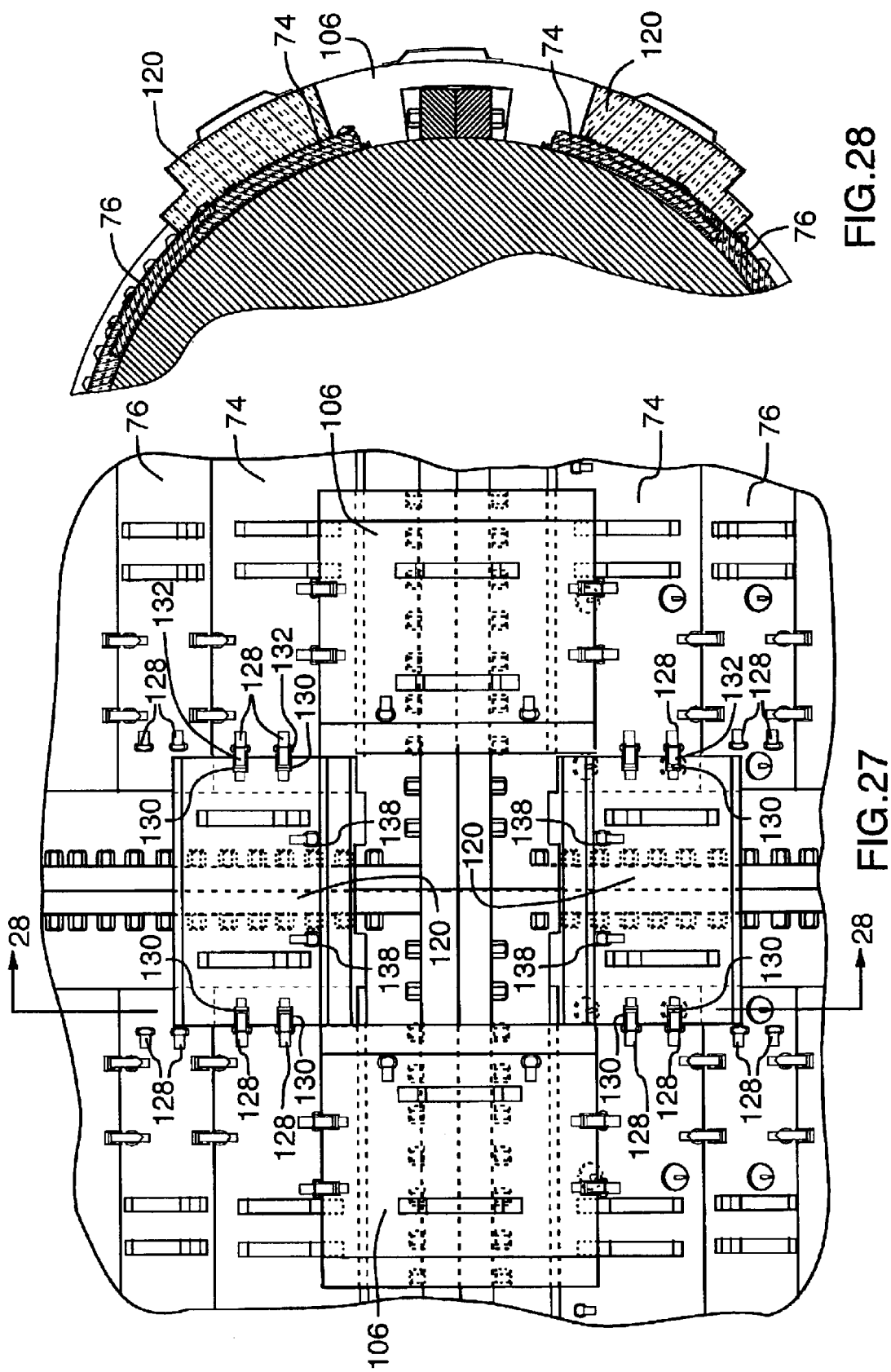

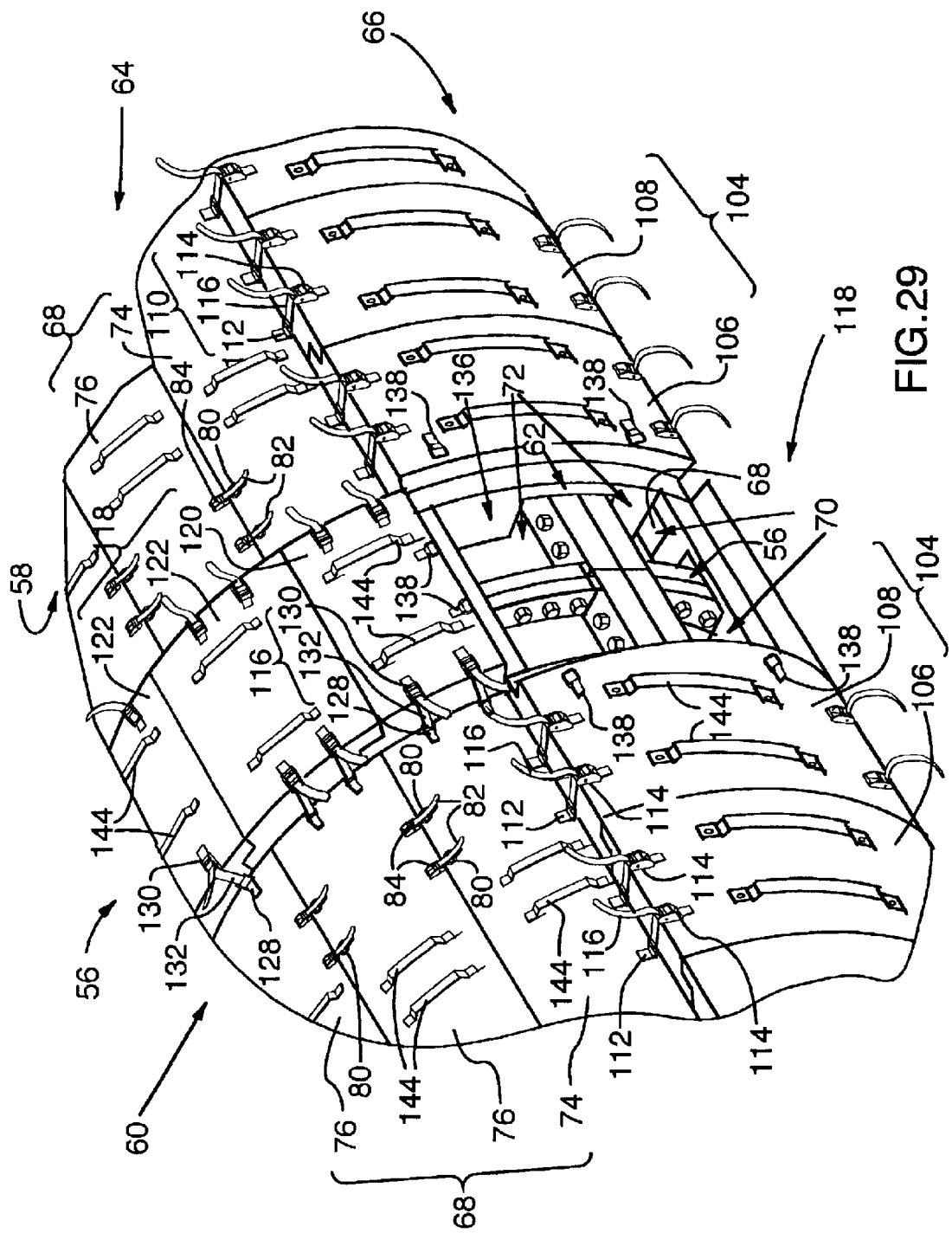

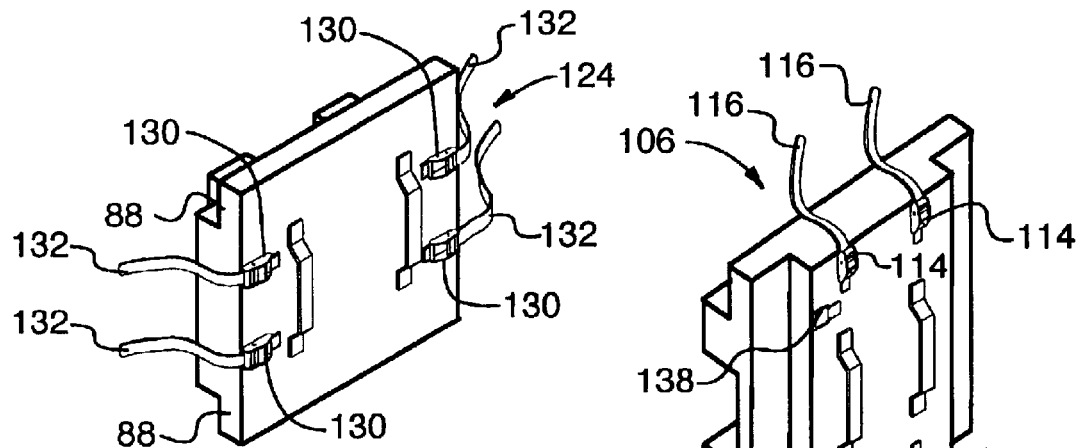
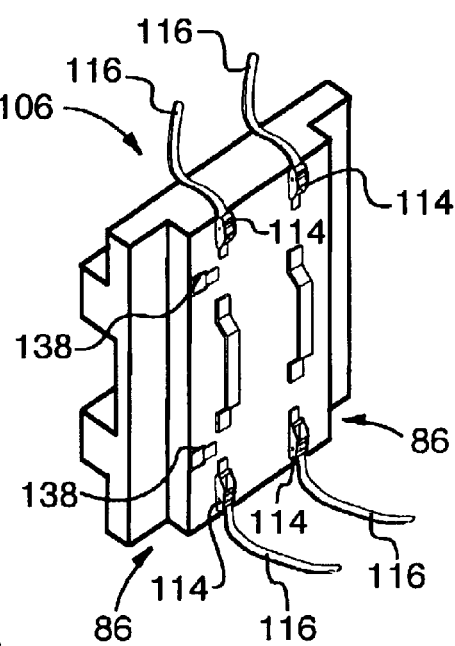
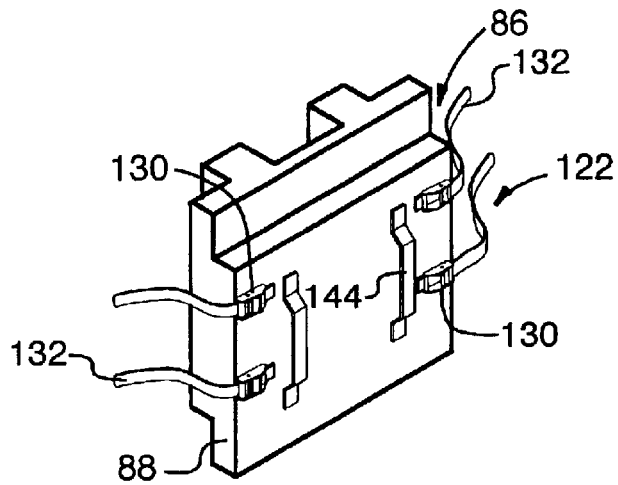
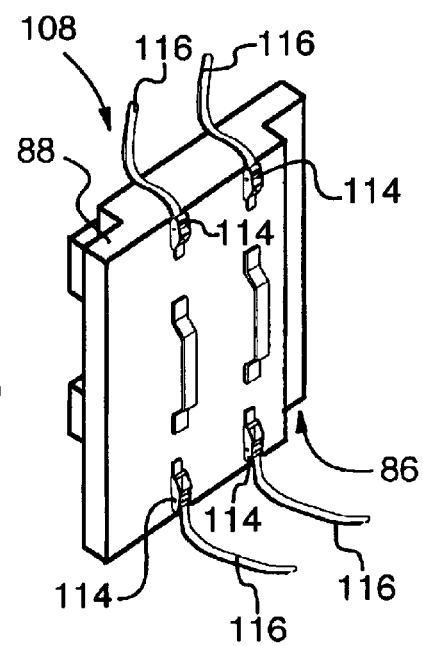
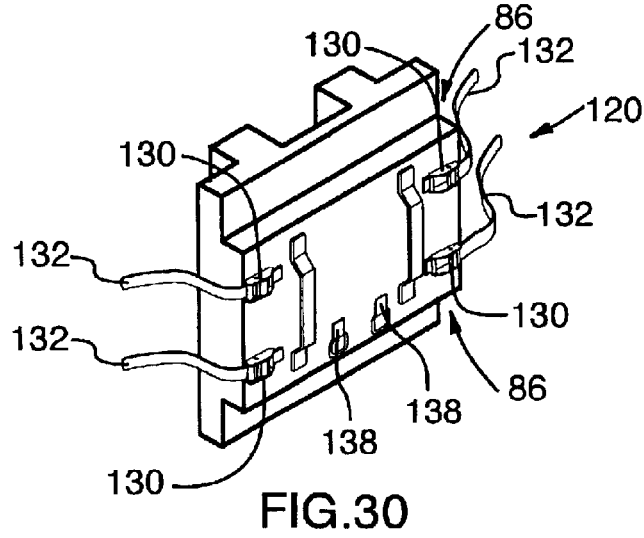

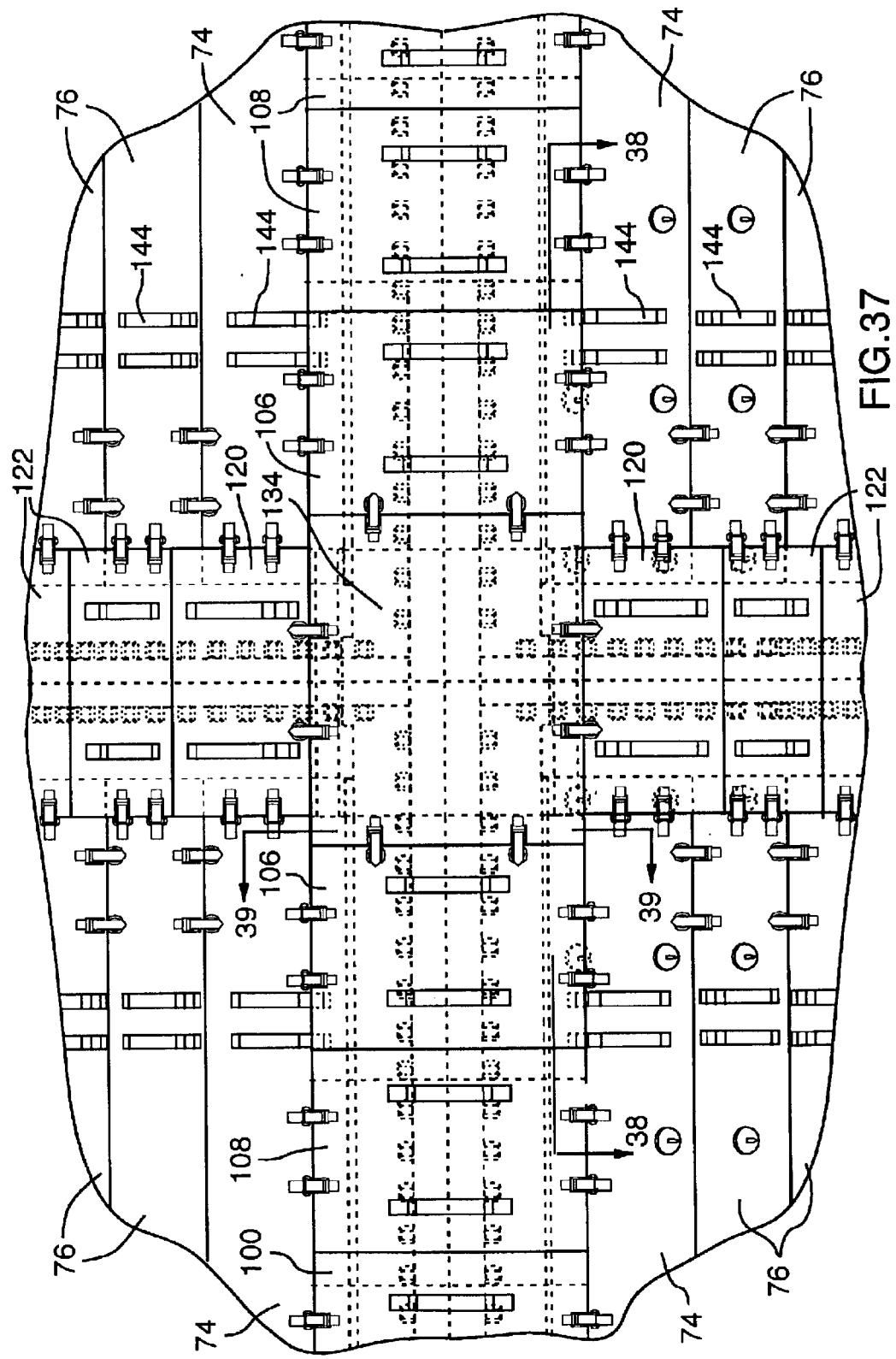

INSULATION SYSTEM FOR A TURBINE AND METHOD

FIELD OF THE INVENTION

The present invention relates to the field of turbine insulation, and more specifically, to insulation systems for the exteriors of turbines and associated piping and fittings, and methods for insulating the same.

BACKGROUND OF THE INVENTION

During the past decade, the gas turbine has emerged as the world's dominant technology for electricity generation. Power companies have built large numbers of new power plants using gas turbines, as a result of their relatively low capital cost, relatively high thermal efficiency and relatively low environmental impact.

Turbines, and associated piping and fittings, are typically provided with an exterior layer of insulation. This improves operating efficiency. As well, it reduces ambient temperatures in the vicinity of the turbine, so as to permit personnel to work in relatively close proximity to the turbine, which would not otherwise be practical.

The insulation provided for said piping and fittings is often mineral material, such as rock wool, which is wrapped in a sealing layer of fiberglass. This provides adequate insulation value. However, as it is necessary, from time to time, to inspect piping and fittings, which requires the time-consuming removal and replacement of said insulation, this manner of insulation can suffer from poor economies.

For turbines, it is known to employ removable insulation blankets. Such blankets are usually custom-shaped, to circumvent piping and the like, which typically bristles from the exterior of a turbine, and are secured by impalement on spikes which are spot-welded to the turbine housing and capped with self-locking washers.

To improve seal integrity between adjacent blankets, lacing hooks are provided on the blankets, and the assembly is tightly laced together with stainless steel soft gauge wire.

This manner of insulation can suffer from poor aesthetics, which can be of significant concern when the capital cost of a turbine is considered. Moreover, proper installation, to obtain acceptable levels of aesthetics and thermal insulation, is relatively time-consuming, even with skilled labour. This can be problematic, as it is necessary to periodically remove the insulation for inspection and maintenance of the turbine, and turbine down-time costs an average utility in lost revenue approximately $1 million per day. It is not unknown, for example, for the removal and installation of a conventional blanket system to take three working days, with commensurate impacts on the bottom line.

SUMMARY OF THE INVENTION

It is an object of the present invention to provide an insulation system for use with a turbine housing of the type having a tubular exterior surface centered about and defining a horizontal longitudinal axis, a vertical joint raised relative to the tubular exterior surface and dividing the housing into fore and aft tubular portions and a pair of horizontal joints raised relative to the tubular exterior surface and dividing the housing into upper and lower arcuate portions, said insulation system providing an adequate insulation value, being relatively aesthetically pleasing and economical to manufacture and being relatively convenient to install and remove, as compared to insulation systems of the prior art.

This object, and others, is met by one aspect of the present invention, an insulation system for use with a turbine housing of the type having a tubular exterior surface centred about and defining a horizontal longitudinal axis, a vertical joint raised relative to the tubular exterior surface and dividing the housing into fore and aft tubular portions and a pair of horizontal joints raised relative to the tubular exterior surface and dividing the housing into upper and lower arcuate portions.

The insulation system comprises four insulation blankets, a pair of first insulation ribs for each longitudinal channel, a pair of second insulation ribs, and an insulation coupling member for each longitudinal channel.

The four insulation blankets are removably positioned, in use, at respective operative positions upon said tubular exterior surface, in spaced relation to the horizontal joints and to the vertical joint so as to define between one another, in combination with the tubular exterior surface of the housing, an annular channel in which the vertical joint is positioned and a pair of longitudinal channels each intersecting the annular channel and having positioned therein a respective horizontal joint.

The pair of first insulation ribs for each longitudinal channel are removably positioned, in use, respectively, fore and aft of said vertical joint, in volume-filling relation to said each longitudinal channel, in straddling, close-fitting relation to the horizontal joint positioned in said each longitudinal channel and in overlapping relation to the insulation blankets disposed, respectively, on the fore and aft tubular portions of the housing.

The pair of second insulation ribs are removably positioned, in use, respectively, above and beneath the horizontal joints, in volume-filling relation to the annular channel, in straddling, close-fitting relation to the vertical joint, and in overlapping relation to the insulation blankets disposed, respectively, on the upper and lower arcuate portions of the housing.

The insulation coupling member for each longitudinal channel is removably positioned, in use, in said each longitudinal channel at the intersection thereof with the annular channel, in volume-filling relation to a void defined by the housing, the first insulation ribs and the second insulation ribs, in straddling, close-fitting relation to the horizontal joint positioned in said each longitudinal channel and to the vertical joint, and in lapped relation to the first insulation ribs and the second insulation ribs.

Another aspect of the invention is a method for insulating a turbine housing of the type having a tubular exterior surface centred about and defining a horizontal longitudinal axis, a vertical joint raised relative to the tubular exterior surface and dividing the housing into fore and aft tubular portions and a pair of horizontal joints raised relative to the tubular exterior surface and dividing the housing into upper and lower arcuate portions.

As steps of the method, the insulation system of the invention is provided, and the insulation blankets thereof are removably positioned at their respective operative positions upon said tubular exterior surface in spaced relation to the horizontal joints and to the vertical joint so as to define between one another, in combination with the tubular exterior surface of the housing, an annular channel in which the vertical joint is positioned and a pair of longitudinal channels each intersecting the annular channel and having positioned therein a respective horizontal joint.

As another step of the method, with respect to each longitudinal channel, the pair of first insulation ribs therefor are removably positioned, respectively, fore and aft of said vertical joint, in volume-filling relation to said each longitudinal channel, in straddling, close-fitting relation to the horizontal joint positioned in said each longitudinal channel and in overlapping relation to the insulation blankets disposed, respectively, on the fore and aft tubular portions of the housing.

As another step of the method, the pair of second insulation ribs are removably positioned, respectively, above and beneath the horizontal joints, in volume-filling relation within the annular channel, in straddling, close-fitting relation to the vertical joint, and in overlapping relation to the insulation blankets disposed, respectively, on the upper and lower arcuate portions of the housing.

As a further step of the method, the pair of insulation coupling members, are removably positioned, respectively, in each longitudinal channel, at the intersection thereof with the annular channel, in volume-filling relation to a void defined by the housing, the first insulation ribs and the second insulation ribs, in straddling, close-fitting relation to the horizontal joint positioned in said each longitudinal channel and to the vertical joint, and in lapped relation to the first insulation ribs and the second insulation ribs.

Other advantages, features and characteristics of the present invention will become more apparent upon consideration of the following detailed description and the appended claims with reference to the accompanying drawings, the latter of which is briefly described hereinbelow.

BRIEF DESCRIPTION OF THE DRAWINGS

In the accompanying drawings, wherein like reference numerals are used to depict similar elements of structure, and which are for the purpose of description only, and not intended as a definition of the limits of the invention:

FIG. 2 is an enlarged view of encircled area 2 in FIG. 1.

FIG. 3 is a view similar to FIG. 2, with a pair of insulation blanket segments positioned on a lower arcuate portion of the housing.

FIG. 4 is a front elevational view of the structure of FIG. 3.

FIG. 5 is a cross-sectional view of the structure of FIG. 3, viewed along section line 5—5 of FIG. 4.

FIG. 7 is a front elevational view of the structure of FIG. 6.

FIG. 8 is a cross-sectional view of the structure of FIG. 6, viewed along section line 8—8 of FIG. 7.

FIG. 12 is a view similar to FIG. 9, with further blanket segments mounted on the housing.

FIG. 13 is a front elevational view of the structure of FIG. 12.

FIG. 14 is a cross-sectional view of the structure of FIG. 12, viewed along section line 14—14 of FIG. 13.

FIG. 16 is a cross-sectional view of the structure of FIG. 15, with components of the turbine not shown, for clarity.

FIG. 17 is a perspective view of a portion of the structure of FIG. 15.

FIG. 18 is a perspective view of a portion of the structure of FIG. 15.

FIG. 19 is a perspective view of a portion of the structure of FIG. 15.

FIG. 22 is a front elevational view of the structure of FIG. 20.

FIG. 23 is a cross-sectional view of the structure of FIG. 20, viewed along section line 23—23 of FIG. 22.

FIG. 27 is a front elevational view of the structure of FIG. 25.

FIG. 28 is a cross-sectional view of the structure of FIG. 25, viewed along section line 28—28 of FIG. 27.

FIG. 29 is a view similar to FIG. 24, but with further first insulation rib segments and second insulation rib segments shown in use.

FIG. 30 is a perspective view of a portion of the structure of FIG. 29, similar to FIG. 21A.

FIG. 31 is a perspective view of a portion of the structure of FIG. 29.

FIG. 32 is a perspective view of a portion of the structure of FIG. 29.

FIG. 33 is a perspective view of a portion of the structure of FIG. 29, similar to FIG. 26A.

FIG. 34 is a perspective view of a portion of the structure of FIG. 29.

FIG. 37 is a front elevational view of the structure of FIG. 35.

DETAILED DESCRIPTION OF A PREFERRED EMBODIMENT

Figure 35:
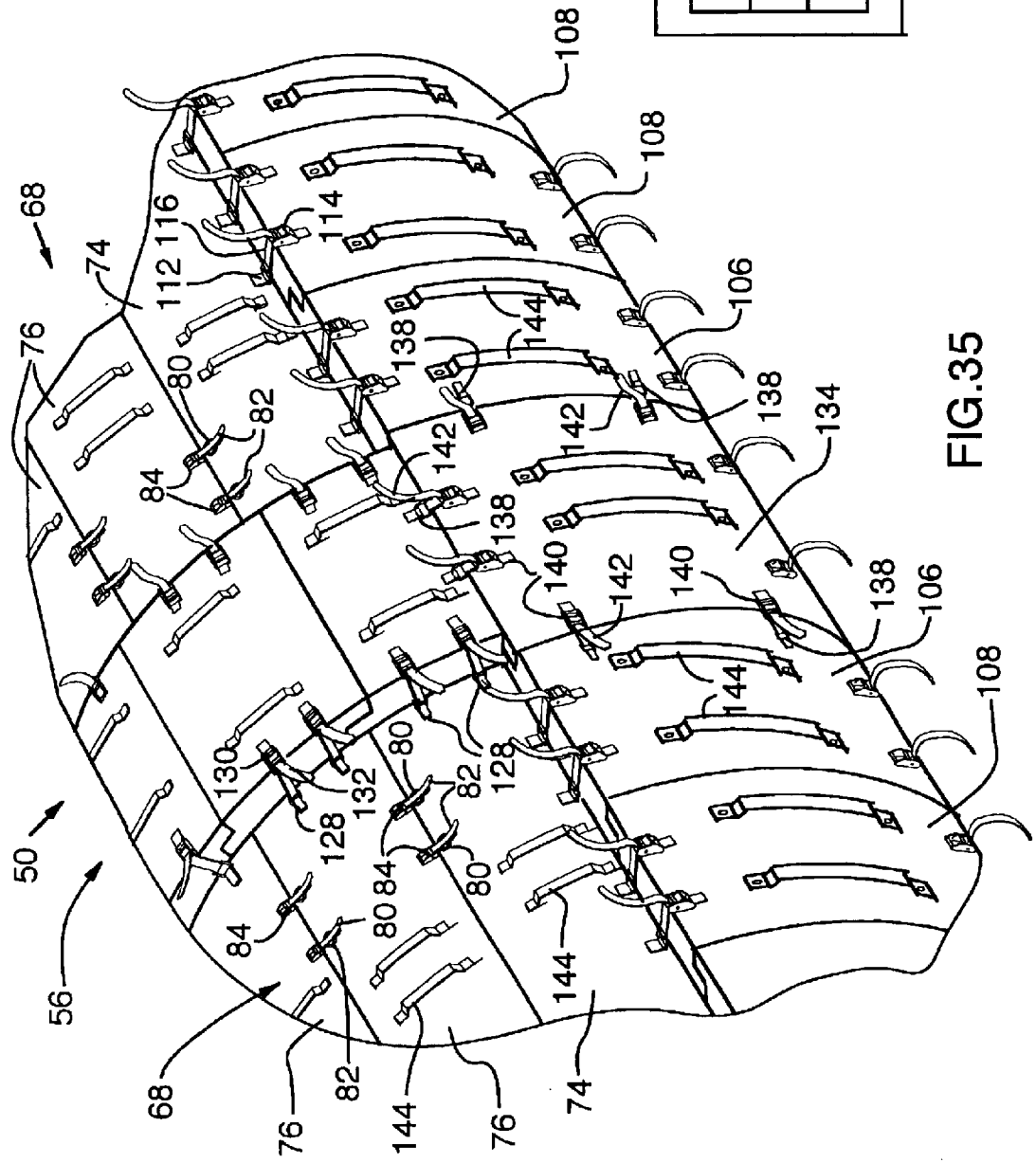
FIG. 35 is a view similar to FIG. 29, but with an insulation coupling member shown in use.
Figure 38:
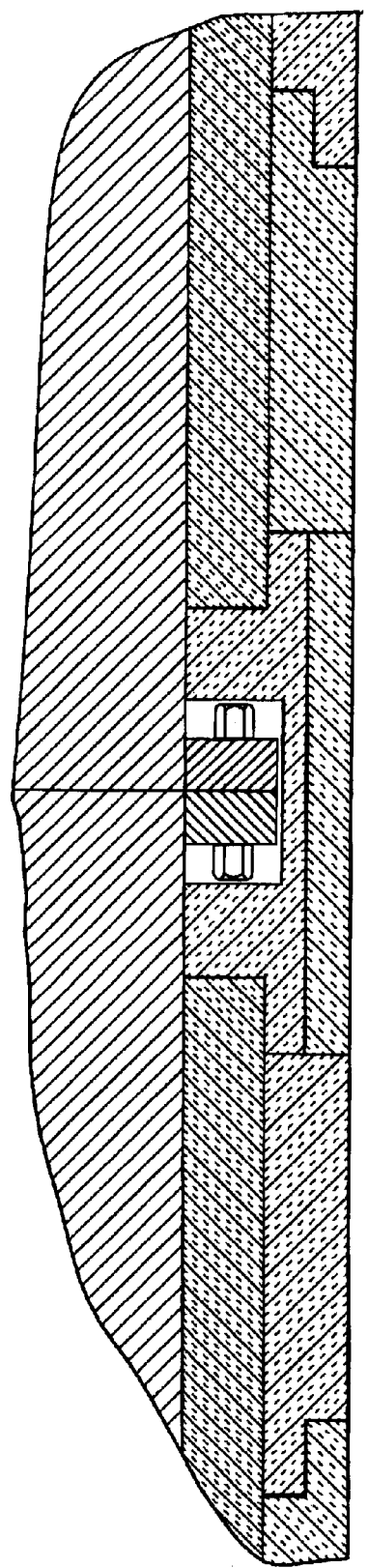
FIG. 38 is a cross-sectional view of the structure of FIG. 35, viewed along section line 38—38 of FIG. 37.
Figure 39:
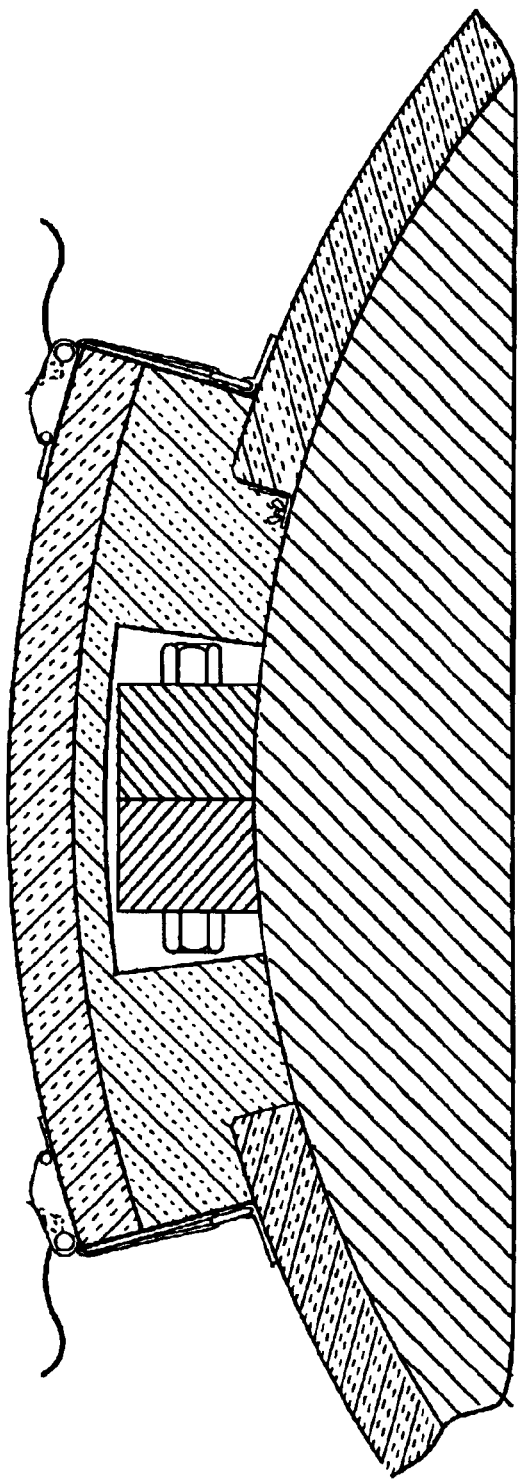
FIG. 39 is a cross-sectional view of the structure of FIG. 35, viewed along section line 39—39 of FIG. 37.

An insulation system according to a preferred embodiment of the present invention is illustrated in use in FIG. 35, and is designated therein with general reference numeral 50.

Figure 1:
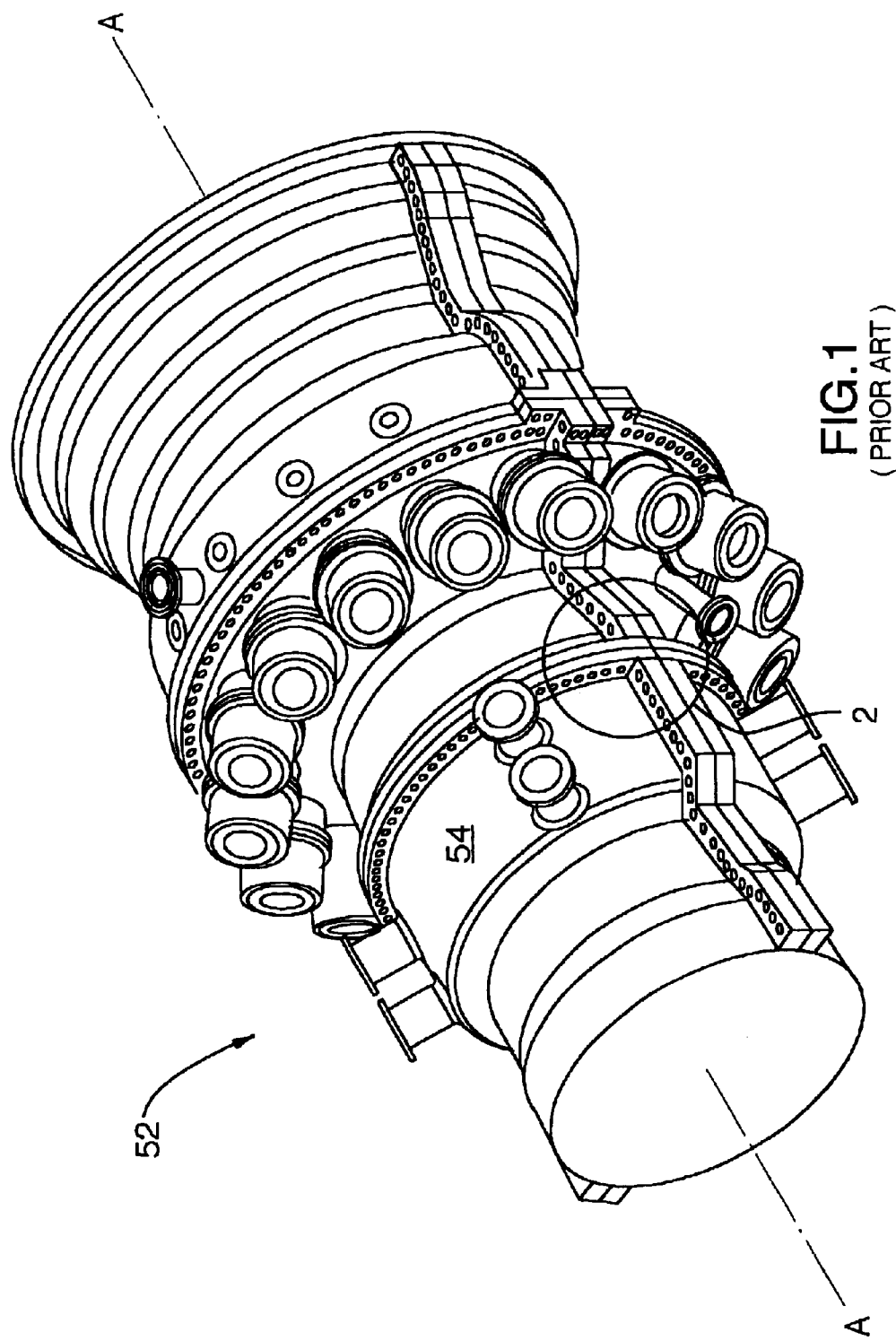
FIG. 1 is a perspective view of a gas turbine housing of the prior art.

The insulation system 50 of FIG. 35 is in use with a turbine housing which is shown in isolation in FIGS. 1,2 and designated therein with general reference numeral 52.

The turbine housing 52, which, for greater certainty, does not form part of the present invention, is of the type having a tubular exterior surface 54 centred about and defining a horizontal longitudinal axis A—A, a vertical joint 56 raised relative to the tubular exterior surface 54 and dividing the housing into fore 58 and aft 60 tubular portions and a pair of horizontal joints 62 (only one shown in FIG. 2) raised relative to the tubular exterior surface 54 and dividing the housing 52 into upper 64 and lower 66 arcuate portions.

The insulation system 50 includes, as main structural elements, insulation blankets 68, as illustrated in FIG. 35.

Figure 15:
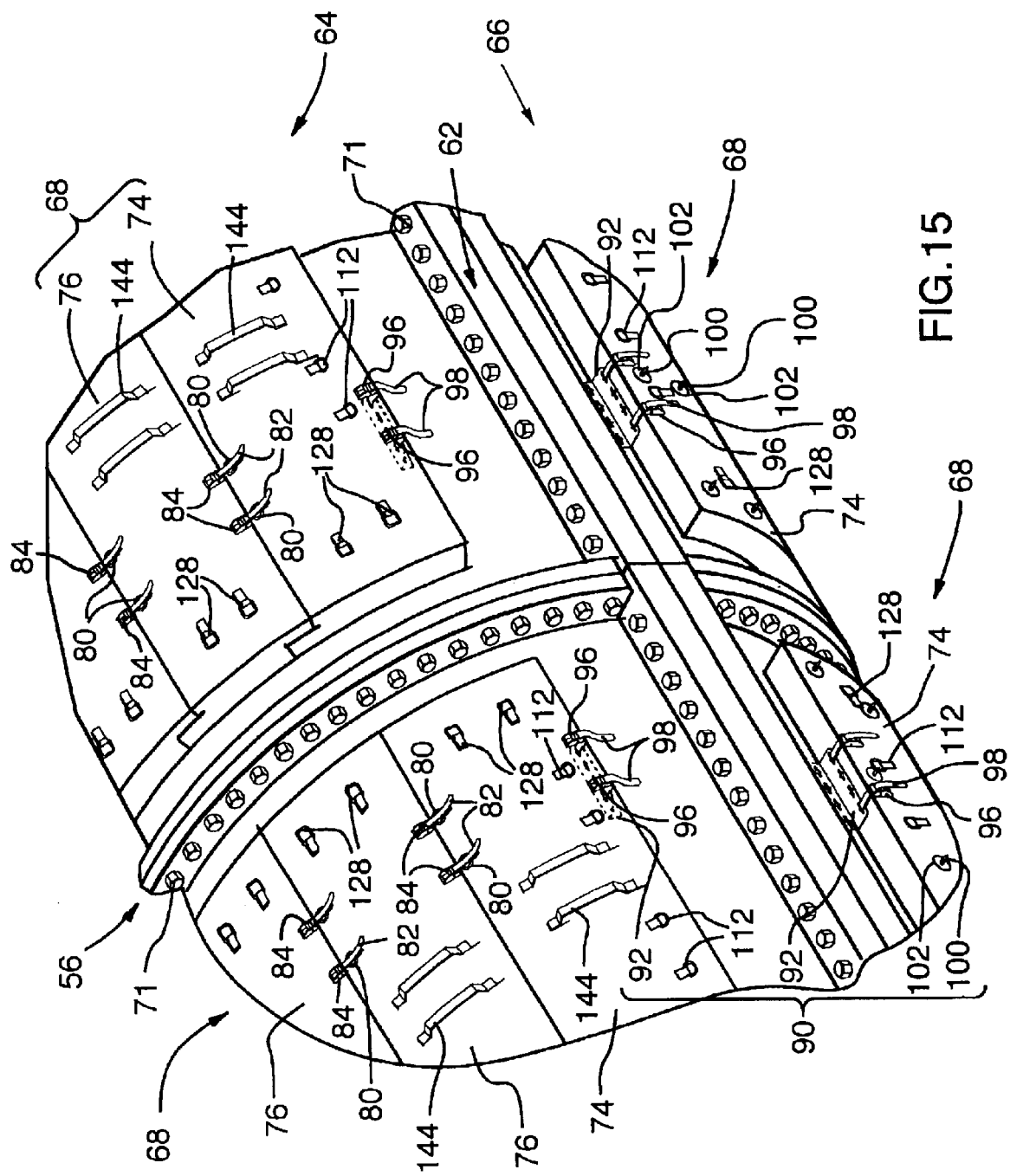
FIG. 15 is a view similar to FIG. 12, but with further blanket segments mounted on the housing.
Figure 21A:
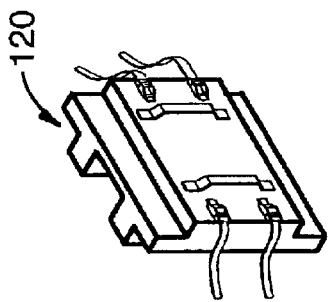
FIG. 21A is a perspective view of one of the second insulation rib segments of FIG. 20.
Figure 21B:
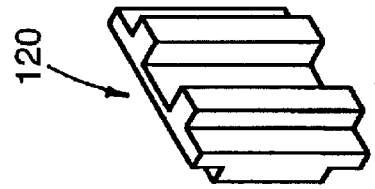
FIG. 21B is a perspective view, from a perspective opposite to that shown in FIG. 21A, of the second insulation rib segment of FIG. 21A.
Figure 20:
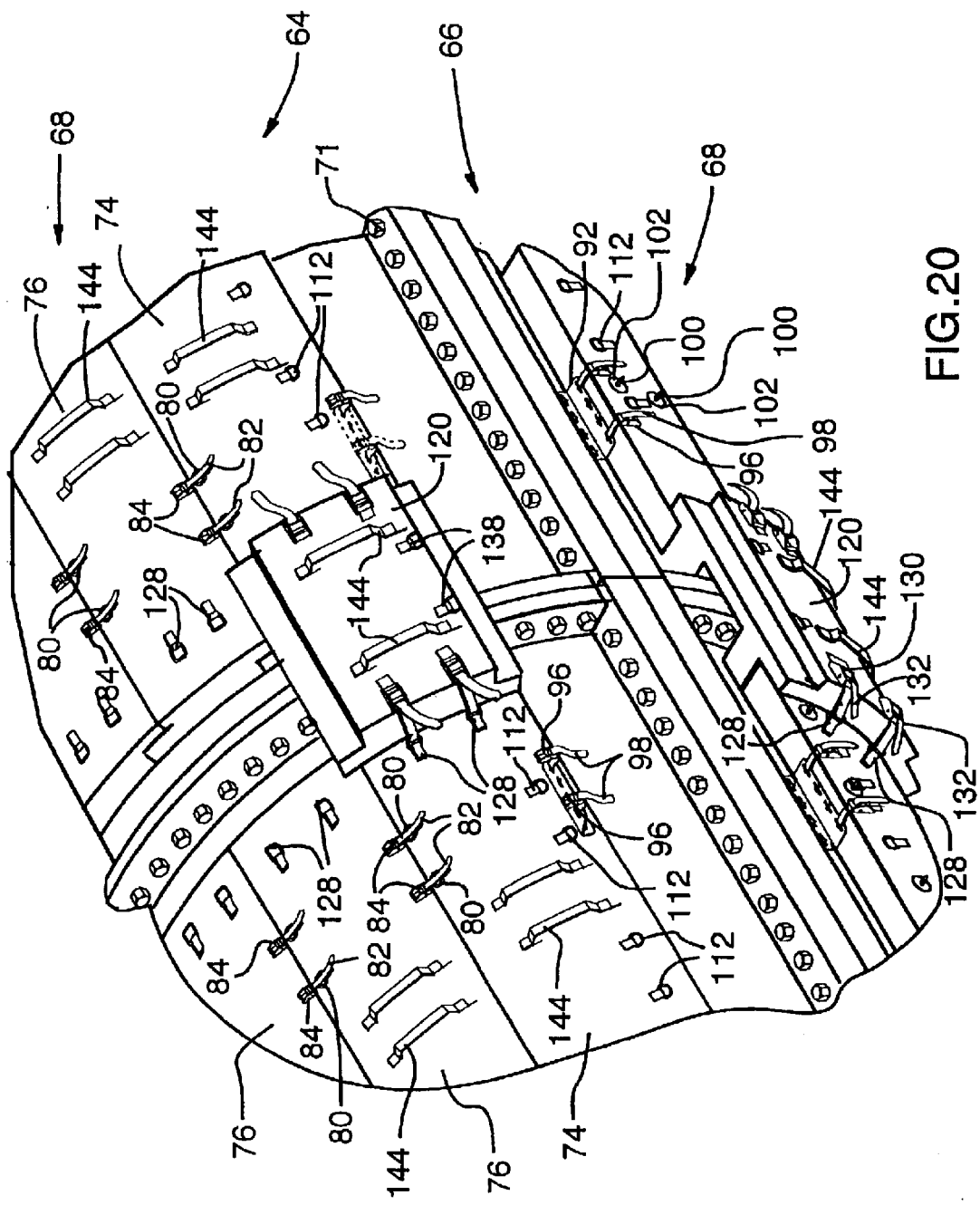
FIG. 20 is a view similar to FIG. 15, with a pair of second insulation rib segments shown in use.
Figure 24:
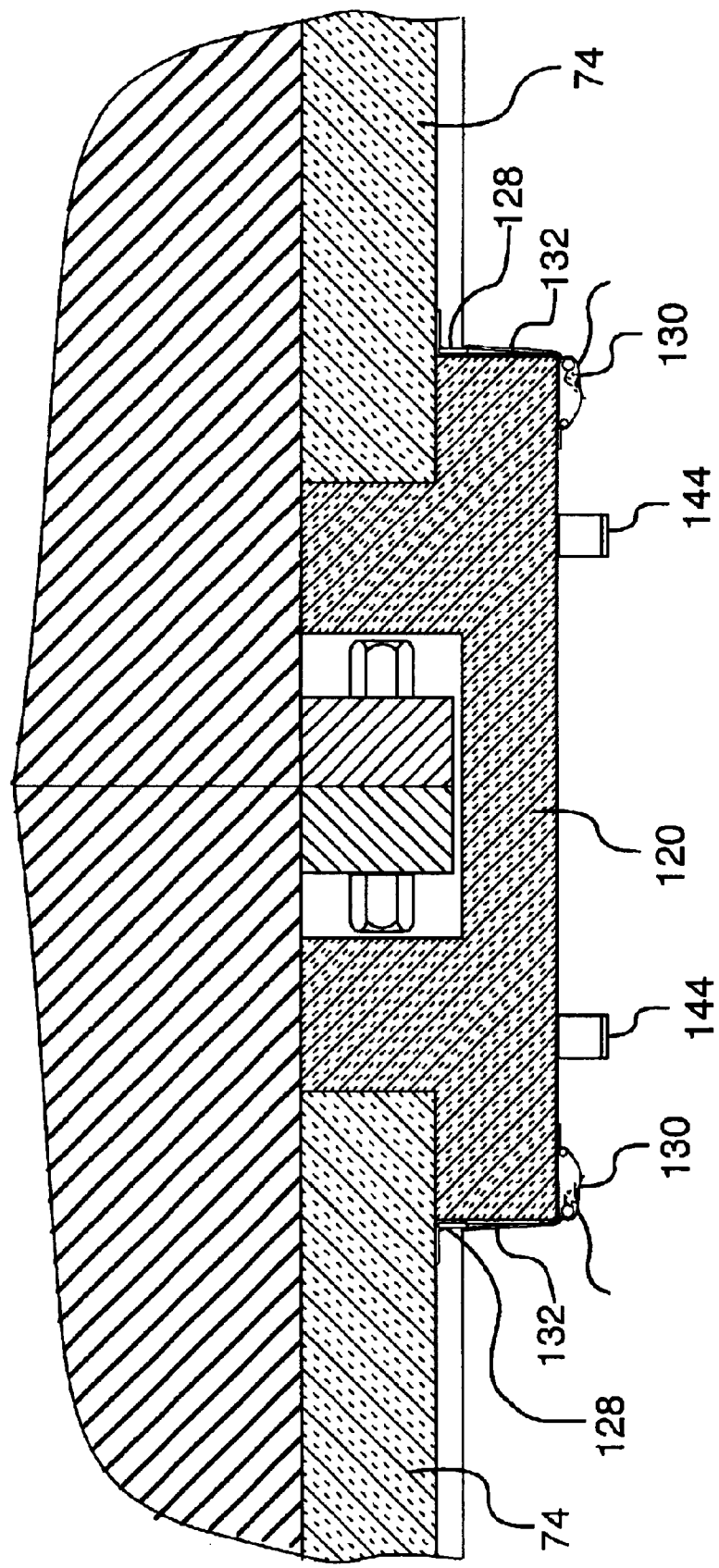
FIG. 24 is a cross-sectional view of the structure of FIG. 20, viewed along section line 24—24 of FIG. 22.
Figure 26A:
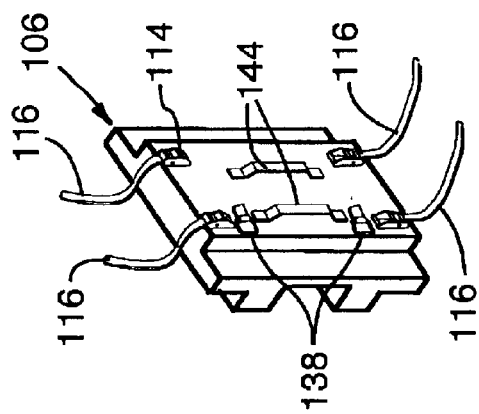
FIG. 26A is a perspective view of one of the first insulation rib segments of FIG. 25.
Figure 26B:
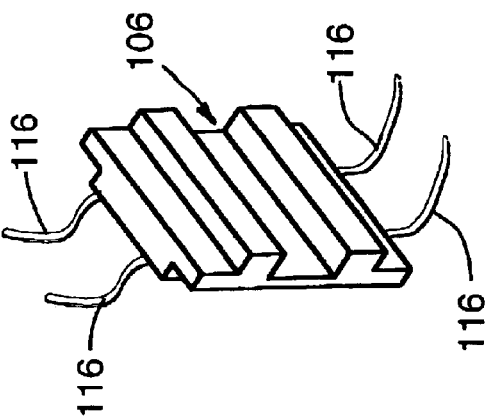
FIG. 26B is a perspective view, from a perspective opposite to that shown in FIG. 26A, of the first insulation rib segment of FIG. 26A.
Figure 25:
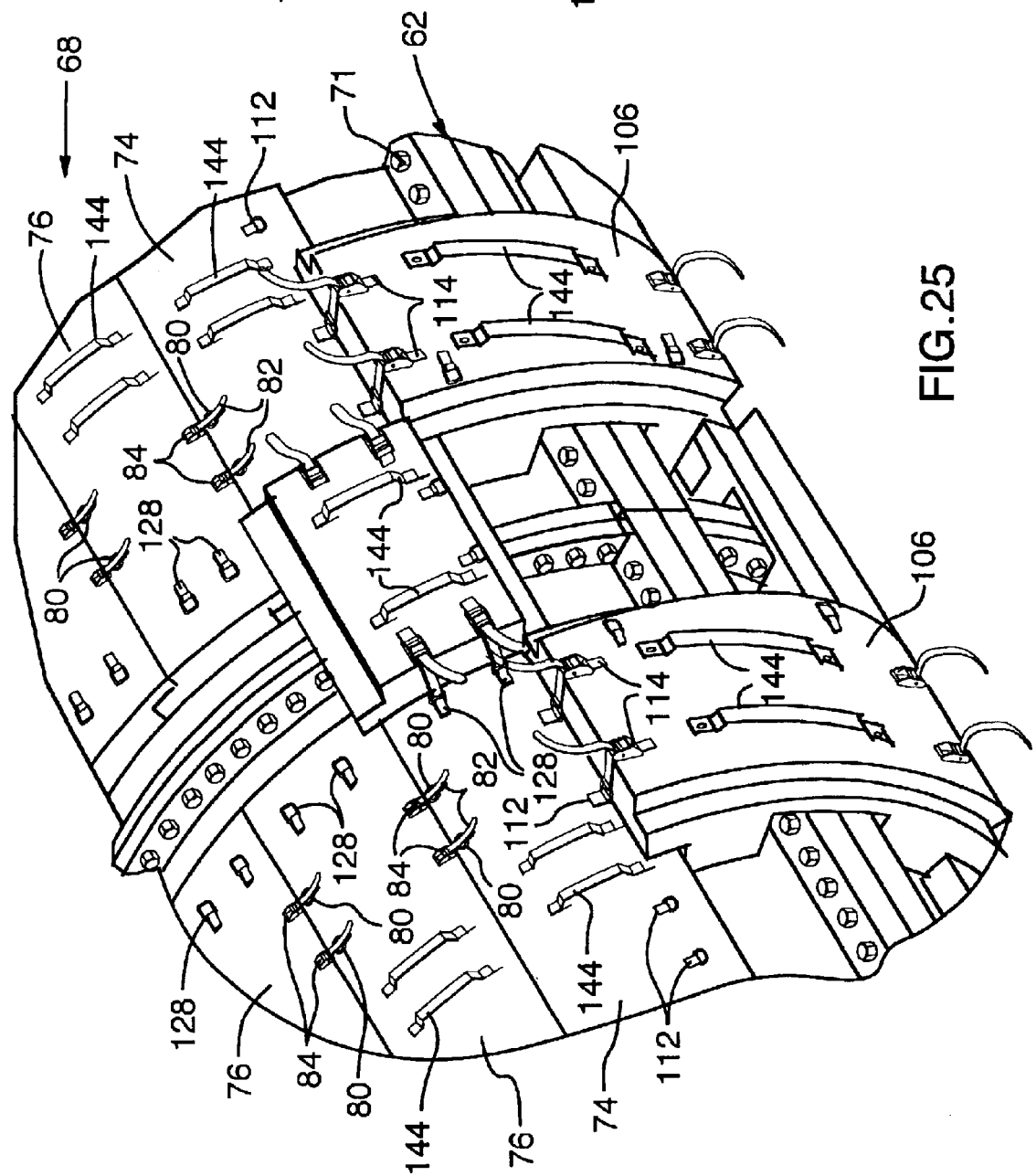
FIG. 25 is a view similar to FIG. 20, with a pair of first insulation rib segments shown in use.
Figure 36A:
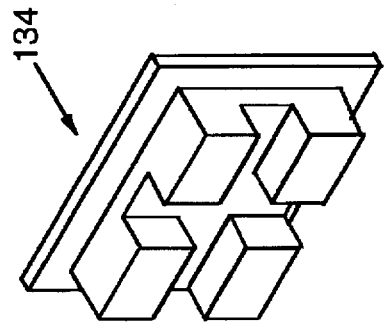
FIG. 36A is a perspective view of the insulation coupling member of FIG. 35.
Figure 36B:
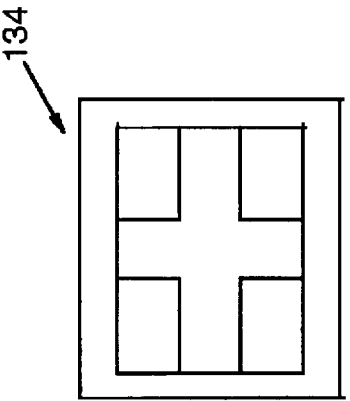
FIG. 36B is an interior elevational view of the insulation coupling member of FIG. 36A.

As best indicated in FIGS. 15,16, four of such insulation blankets 68 are positioned at respective operative positions upon the tubular exterior surface 54, in spaced relation to the horizontal joints 62 and the vertical joint 56 so as to define between one another, in combination with the tubular exterior surface 54, an annular channel 70, shown in dotted outline in FIG. 15, in which the vertical joint 56 is positioned and a pair of longitudinal channels 72, shown in FIG. 16, each intersecting the annular channel 70 and in which a respective horizontal joint 62 is positioned.

The annular channel 70 and longitudinal channels 72 are dimensioned so as to permit convenient removal of the bolts 71 which secure the horizontal joints 62 and the vertical joint 56, having regard both to the length of the bolt 71, which may be retracted from either side of the joint 62,56, and also to the thickness of the insulation blanket 68.

As illustrated, inter alia, in FIGS. 15,16, each insulation blanket 68 comprises a plurality of individual blanket segments 74,76,78 arranged in half-lap relation to one another, as well as means for releasably securing the plurality of blanket segments 74,76,78 of each insulation blanket 68 to one another in such arrangement, which means, as illustrated, comprises a plurality of loop 80, strap 82 and clasp 84 assemblies operably mounted to said blanket segments 74,76,78, as shown in FIG. 15.

As indicated in FIGS. 17–19, the blanket segments take one of three types. The first type 74, shown in isolation in FIG. 17, includes a rabbet 86 along only one edge, and is used to form a longitudinally extending edge of a respective insulation blanket 68. The second type 76, shown in FIG. 18 in isolation, includes a rabbet 86 and a tongue 88, and is used repetitively to fill the field of an insulation blanket 68. The third type 78, shown in isolation in FIG. 19, includes two tongues 88,88, and is used as a junction, or bridging segment.

Figure 6:
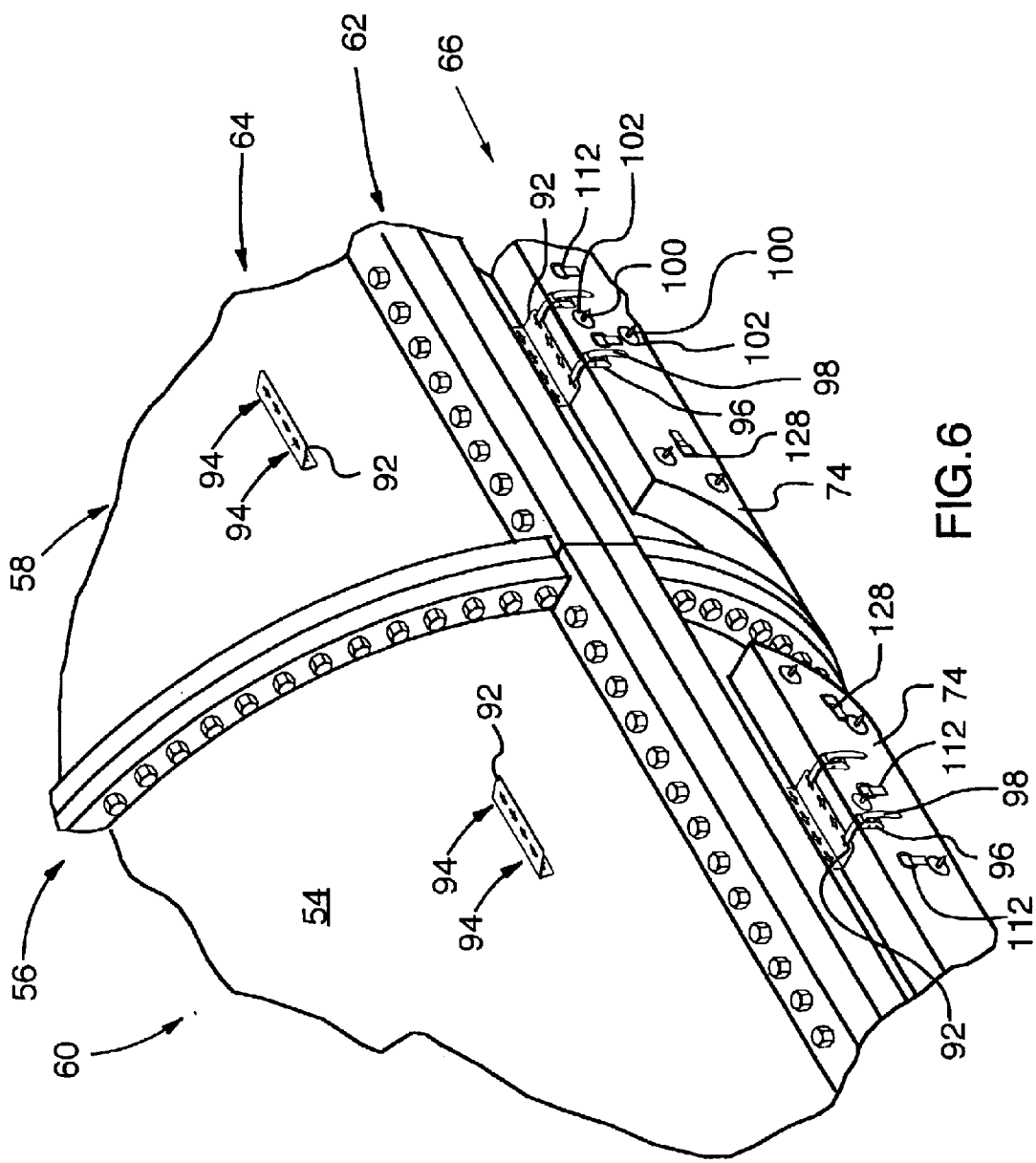
FIG. 6 is a view similar to FIG. 3, with a pair of positioning members mounted on an upper arcuate portion of the housing.

Means for releasably securing insulation blankets 68 at their respective operative positions is also provided, such means being designated with general reference numeral 90 in FIG. 15 and comprising a plurality of positioning members 92, each defining at least one positioning loop 94. In the preferred embodiment, each positioning member has formed therein four slots, with the outermost pair of said slots each defining a positioning loop 94, as shown in FIG. 6. Such means 90 further comprises a positioning strap 98 for each positioning loop 94, and a positioning clasp 96 for each positioning strap 98.

The positioning members 92, positioning clasps 96 and positioning straps 98 are arranged such that a pair of positioning members 92 are securely mounted to the housing 52 in circumferentially-bracketing relation to said each insulation blanket 68, as shown in FIG. 16, the positioning straps 98 for the positioning loops 94 defined by said positioning members 92 are securely attached to said each insulation blanket 68 and extend therefrom, downwardly (ie towards the longitudinal axis) and back to the positioning clasps 96 provided therefor, which are securely attached to said each insulation blanket 68, to urge the insulation blanket 68 against the housing 52 and the positioning member 92.

Such means 90 for releasably securing the insulation blankets 68 at their respective operative positions further comprises a plurality of spikes 100 and a plurality of lock washers 102. The plurality of spikes 100 are secured to the lower arcuate portion 66 of the housing 52 and have impaled thereon the insulation blankets 68 disposed on said lower arcuate portion 66. The plurality of lock washers 102 are each seated on a respective spike 100 in exteriorly abutting relation to said insulation blankets 68, holding same in place.

As further main structural elements of the insulation system 50, a pair of first insulation ribs 104 is provided for each longitudinal channel 72, said pair 104,104 being removably positioned, as best indicated in FIG. 29, respectively, fore and aft of said vertical joint 56, in volume-filling relation to said each longitudinal channel 72, in straddling, close-fitting relation to the horizontal joint 62 positioned in said each longitudinal channel 72 and in overlapping relation to the insulation blankets 68 disposed, respectively, on the fore 58 and aft 60 tubular portions of the housing.

Each first insulation rib 104 comprises a plurality of first insulation rib segments 106,108, suitably rabbeted and tongued and arranged in half-lap relation to one another.

Two types of first insulation rib segments are shown. The first 106, shown in FIG. 33, has rabbets 86 on two sides, and is disposed immediately adjacent the intersection of the horizontal joint 62 and the vertical joint 56. The second 108, shown in FIG. 34, which has a rabbet 86 and a tongue 88, is a repeat unit.

Also provided is means for releasably securing each first insulation rib segment 106,108 to the insulation blankets 68 which it overlaps in use. As illustrated in FIG. 29, such means, designated with general reference numeral 110, comprises a plurality of first rib securing loops 112, a first rib securing strap 116 for each first rib securing loop 112 and a first rib securing clasp 114 for each first rib securing strap 116. The first rib securing loops 112, first rib securing straps 116 and first rib securing clasps 114 are arranged such that, for each first insulation rib segment 106,108, at least one of said plurality of first rib securing loops 112 is securely attached to the exterior surface of each of the insulation blankets 68 which said each first insulation rib segment 106,108 overlaps in use, the first rib securing straps 116 for said first rib securing loops 112 are securely attached to said each first insulation rib segment 106,108 and extend therefrom, in use, downwardly through said first rib securing loops 112, and back to the first rib securing clasps 114 provided therefor, which are securing attached to said each first insulation rib segment 106,108.

As a further main structural feature of the insulation system 50, a pair of second insulation ribs 118 is provided, said pair of second insulation ribs 118, as best seen in FIG. 29, being removably positioned, respectively, above and beneath the horizontal joints 62, in volume-filling relation to the annular channel 70, in straddling, close-fitting relation to the vertical joint 56, and in overlapping relation to the insulation blankets 68 disposed, respectively, on the upper 64 and lower 66 arcuate portions of the housing.

Each second insulation rib 118 comprises a plurality of second insulation rib segments 120,122,124 arranged in half-lap relation to one another. As indicated in FIGS. 30–32, the second insulation rib segments take one of three types. The first type 120, shown in isolation in FIG. 30, includes a rabbet 86 along two edges, and is disposed immediately adjacent the intersection of the horizontal joint 62 and the vertical joint 56. The second type 122, which has a rabbet 86 and a tongue 88, is a repeat unit, and is shown in isolation in FIG. 31. The third type 124, shown in isolation in FIG. 32, includes two tongues 88, and is used as a junction, or bridging segment. The interaction of the second insulation rib segments 120,122,124 with one another in use is similar to the interaction of the insulation blanket segments 74,76,78 as shown in FIG. 16, and as such, is not described in detail herein.

Also provided is means for releasably securing each second insulation rib segment 120,122,124 to the insulation blankets 68 which it overlaps in use. As illustrated in FIG. 29, such means, designated with general reference numeral 116, comprises a plurality of second rib securing loops 128, a second rib securing strap 132 for each second rib securing loop 128 and a second rib securing clasp 130 for each second rib securing strap 132. The second rib securing loops 128, second rib securing straps 132 and second rib securing clasps 130 are arranged such that, for each second insulation rib segment 120,122,124, at least one of said plurality of second rib securing loops 128 is securely attached to the exterior surface of each of the insulation blankets 68 which said each second insulation rib segment 120,122,124 overlaps in use, the second rib securing straps 132 for said second rib securing loops 128 are securely attached to said each second insulation rib segment 120,122,124 and extend therefrom, in use, downwardly through said second rib securing loops 128, and back to the second rib securing clasps 130 provided therefor, which are securely attached to said each second insulation rib segment 120,122,124.

As a final main structural element of the insulation system 50, an insulation coupling member 134 is provided for each longitudinal channel 72, said insulation coupling member 134 being shown in FIG. 35 and being removably positioned, as indicated by FIGS. 29,35, in said each longitudinal, channel 72 at the intersection thereof with the annular channel 70, in volume-filling relation to a void 136 defined by the housing 52, the first insulation ribs 104, the second insulation ribs 118 and the insulation blankets 68, in straddling, close-fitting relation to the horizontal joint 62 positioned in said each longitudinal channel 72 and to the vertical joint 56, and in overlapped relation, specifically, half-lap relation, to the first insulation ribs 104 and the second insulation ribs 118.

Also provided is means for releasably securing each insulation coupling member 134 to the first insulation ribs 104 and second insulation ribs 118 which it overlaps in use. Such means comprises a plurality of coupler loops 138, a coupler strap 142 for each coupler loop 138 and a coupler clasp 140 for each coupler strap 142, arranged such that, for each insulation coupling member 134, at least one of said plurality of coupler loops 138 is securely attached to the exterior surface of each of said first insulation ribs 104 and second insulation ribs 118, wherein the coupler straps 142 for said coupler loops 138 are securely attached to said each insulation coupling member 134 and extend therefrom, in use, through said coupler loops 138 and back to the coupler clasps 140 provided therefor, which are securely attached to said each insulation coupling member 134, to urge the insulation coupling member 134 against said first insulation ribs 104 and second insulation ribs 118.

In order to insulate a turbine housing 52 of the type shown in FIG. 2 with the insulation system of the present invention, the insulation blankets 68 are releasably secured in place at their respective operative positions upon the tubular exterior surface 54 of said housing 52 in spaced relation to the horizontal joints 62 and to the vertical joint 56.

As so positioned, the insulation blankets 68 define between one another, in combination with the tubular exterior surface 54 of the housing 52, an annular channel 70 in which the vertical joint 56 is positioned and a pair of longitudinal channels 72 each intersecting the annular channel 70 and having positioned therein a respective horizontal joint 62, as shown in FIGS. 15,16.

This step involves securely mounting the positioning members 92 to the housing 52 by welding, and securing the plurality of spikes 100 to the lower arcuate portion 66 of the housing 52 by welding, as indicated generally by FIG. 6.

Figure 9:
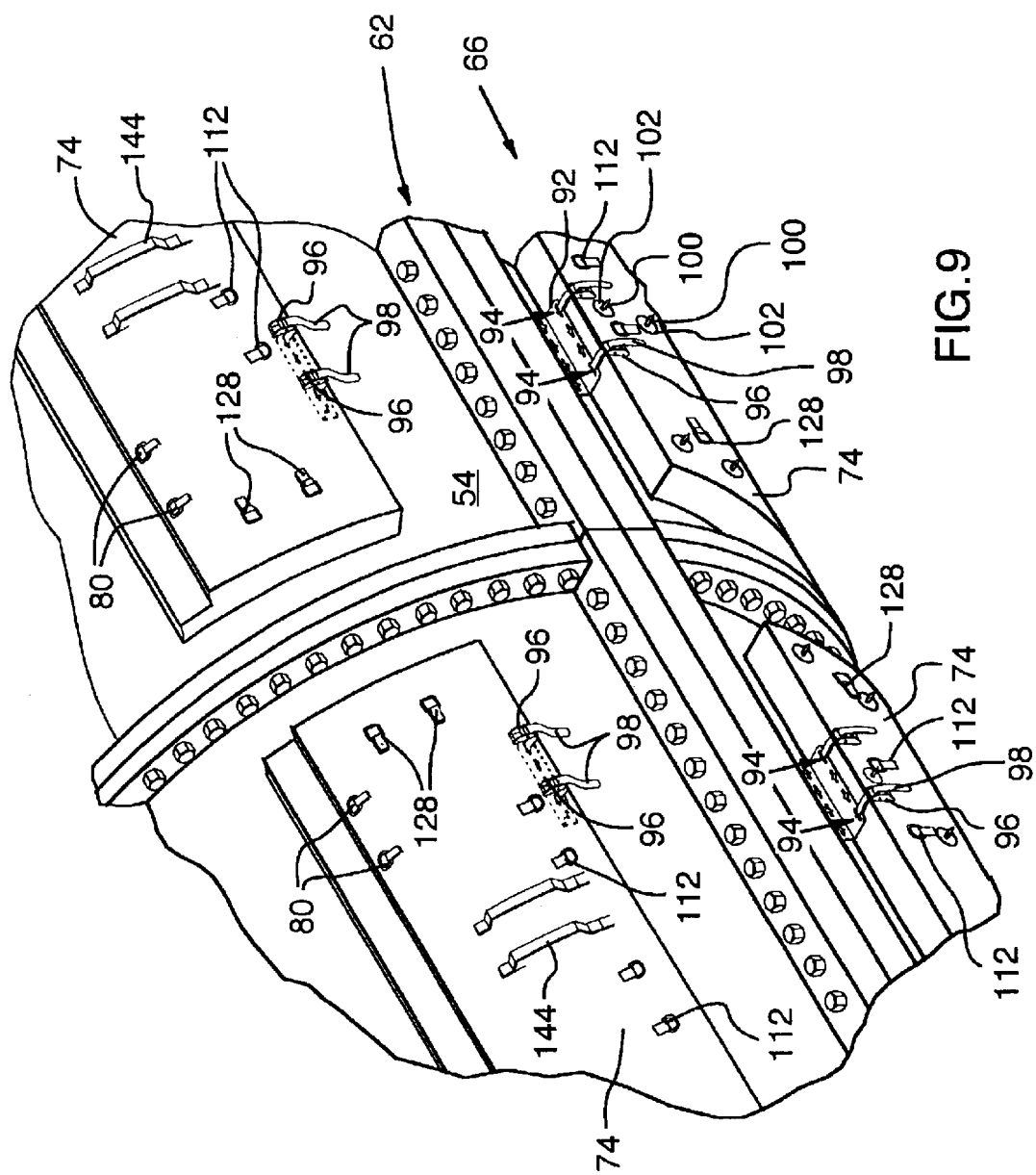
FIG. 9 is a view similar to FIG. 6, with a pair of blanket segments mounted on the upper arcuate portion of the housing and secured to respective positioning members.
Figures 10, 11:
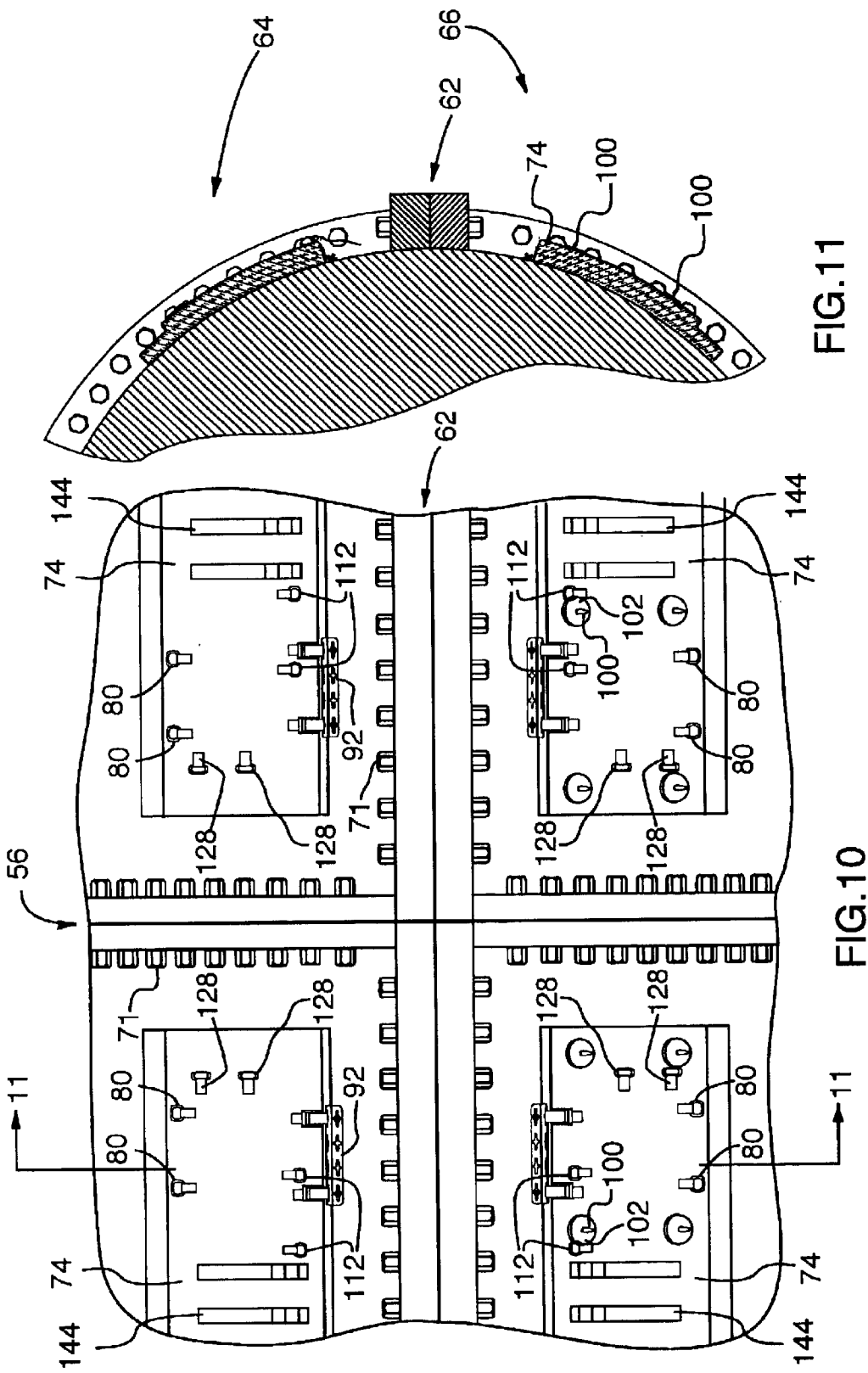
FIG. 10 is a front elevational view of the structure of FIG. 9.
FIG. 11 is a cross-sectional view of the structure of FIG. 9, viewed along section line 11—11 of FIG. 10.

Thereafter, starting from the ends of each insulation blanket 68 immediately adjacent a horizontal joint 62 and working towards the middle, each of the blanket segments 74,76,78 which form said each insulation blanket 68 is positioned one after another on the housing 52, in half-lap relation to adjacent insulation blanket segments 74,76,78, and adjacent insulation blanket segment 74,76,78 are secured to one another by the loop 80, belt 82 and clasp 84 assemblies. The sequence of FIGS. 9,12,15 illustrates this process.

For the insulation blankets 68 disposed on the lower arcuate portion 66, the step of positioning each blanket segment 74,76,78 involves impaling same on said plurality of spikes 100, and seating a lock washer 102 on each of the spikes 100 upon which the blanket segment 74,76,78 has been impaled, in exteriorly abutting relation to said blanket segment 74,76,78, to hold same in place.

As spikes are not provided for the insulation blankets 68 disposed on the upper arcuate portion 64, it will be evident that until such time as said insulation blankets 68 are complete, the segments 74,76,78 thereof will be prone to falling off the housing 52.

The aforementioned positioning members 92, in addition to serving as a locating mechanism for insulation blankets 68, resist this tendency, and although only four positioning members 92 are shown in FIG. 6, one for each insulation blanket 68, it should be understood that at least a further four positioning members 92, and preferably, a further eight, are welded to the housing 52 (on the portion of the housing 52 that is non-visible in FIG. 6) such that, in use, each insulation blanket 68 will be circumferentially bracketed by at least a pair of positioning members 92, and preferably, by at least two pairs of positioning members 92, longitudinally spaced-apart from one another, to support the insulation blanket segments 74,76,78 until such time as the insulation blankets 68 are completed.

To complete the releasable securement of the insulation blankets 68, on the blanket segments 74 immediately adjacent the positioning members 92, the positioning straps 98 secured to said each insulation blanket 68 are threaded through respective loops 94 of said pair of positioning members 92, and drawn through a respective positioning clasp 96 to urge said each insulation blanket 68 against the housing 52 and secure same in place, as indicated in FIG. 9.

Once the insulation blankets 68 are so operatively positioned and secured, as illustrated in FIGS. 15,16, attention is directed to the first insulation ribs 104 and the second insulation ribs 118. Generally, with respect to each longitudinal channel 72, the pair of first insulation ribs 104 therefor are positioned, respectively, fore and aft of said vertical joint 56, in volume-filling relation to said each longitudinal channel 72, in straddling, close-fitting relation to the horizontal joint 62 positioned in said each longitudinal channel 72 and in overlapping relation to the insulation blankets 68 disposed, respectively, on the fore 58 and aft 60 tubular portions of the housing, as shown in FIG. 29.

For each first insulation rib 104, this involves positioning each of the first insulation rib segments 106,108 which form the same in seriatim in volume-filling relation to said each longitudinal channel 72, in straddling, close-fitting relation to the horizontal joint 62 positioned in said each longitudinal channel 72, in overlapping relation to the adjacent insulation blankets 68, and in half-lap relation to adjacent first insulating rib segments 106,108.

It also involves threading the first rib securing straps 116 secured to said each first insulation rib segment 106,108 through the first rib securing loops 112 for which they were provided, and drawing said first rib securing straps 116 back through the first rib securing clasps 114 provided therefor, to urge said each first insulation rib segment 106,108 against said insulation blanket 68.

The pair of second insulation ribs 118 is positioned, respectively, above and beneath the horizontal joints 62, in volume-filling relation within the annular channel 70, in straddling, close-fitting relation to the vertical joint 56, and in overlapping relation to the insulation blankets 68 disposed, respectively, on the upper 64 and lower 66 arcuate portions of the housing 52, as illustrated in FIG. 29.

Assembling each second insulation rib 118 follows methodology similar to that applied in respect of the insulation blankets 68, namely, starting from the ends of each second insulation rib 118 immediately adjacent the horizontal joint 62 and working towards the middle, each of the second rib segments 120,122,124 which form said each second insulation rib 118 is positioned one after another, in volume-filling relation to the annular channel 70, in straddling, close-fitting relation to the vertical joint 56, in overlapping relation to the adjacent insulation blankets 68, and in half-lap relation to adjacent second insulating rib segments 120,122,124.

Additionally, the second rib securing straps 132 secured to said each second insulation rib segment 120,122,124 are threaded through the second rib securing loops 128 for which they were provided, and drawn back through the second rib securing clasps 130 provided therefor, to urge said each second insulation rib segment 120,122,124 against said insulation blankets 68.

Installation of the first insulation ribs 104 and the second insulation ribs 118 is indicated generally by the sequence of FIGS. 15,20,25,29.

With the first insulation ribs 104 and second insulation ribs 118 in place, the pair of insulation coupling members 134 is positioned, respectively, in each longitudinal channel 72, at the intersection thereof with the annular channel 70, in volume-filling relation to a void 136 defined by the housing 52, the first insulation ribs 104, the second insulation ribs 118 and the insulation blankets 68, in straddling, close-fitting relation to the horizontal joint 62 positioned in said each longitudinal channel 72 and to the vertical joint 56, and in lapped, specifically, half-lap relation, to the first insulation ribs 104 and the second insulation ribs 118. Installation of the insulation coupling members 134 is indicated by the sequence of FIGS. 29,35.

Thereafter, the coupler straps 142 attached to said each insulation coupling member 134 are threaded through the coupler loops 138 on the exterior surface of the first insulation ribs 104 and second insulation ribs 118 for which they were provided, and drawn back through the coupler clasps 140 provided therefor, to urge the insulation coupling member 134 against said first insulation ribs 104 and second insulation ribs 118.

This conveniently provides a substantially continuous layer of insulation about the housing, which admits removal by reversing the steps previously outlined.

Various modifications and alterations may be used in the design and manufacture of insulation system according to the present invention without departing from the spirit and scope of the invention.

Foremost in this regard, it is noted that the foregoing description contemplates only a single vertical joint in a housing and a pair of horizontal joints, whereas it is not uncommon for more than one vertical joint to be present in a turbine housing, and it is emphasized that the present invention can readily be deployed in such circumstances. For example, in a housing having three vertical joints and two horizontal joints, a coherent insulation layer according to the invention could be provided by eight insulation blankets, eight first insulation ribs, six second insulation ribs and six insulation coupling members (not shown).

Of course, the insulation blankets, first insulation ribs, second insulation ribs and insulation coupling members may be constructed and dimensioned to meet varying turbine shapes and dimensions, as well as insulation needs. In the preferred embodiment, for example, the foregoing is constructed out of fiberglass insulation, for reasons of economy, sheathed with a high temperature cloth, such as impregnated silicon, and stitched with a high temperature thread, such as polyester Inconel thread. However, in certain instances, other insulation materials, such as aerogels, may be utilized, in isolation or in conjunction with fiberglass matting, to reduce the thickness of the insulation blanket. Additionally, other high temperature flexible materials, such as polytetrafluorethylene material, or even thin gauge sheet steel, may be selected for sheathing, depending upon the particular application, and costs and availability of substitutes.

Figure 45:
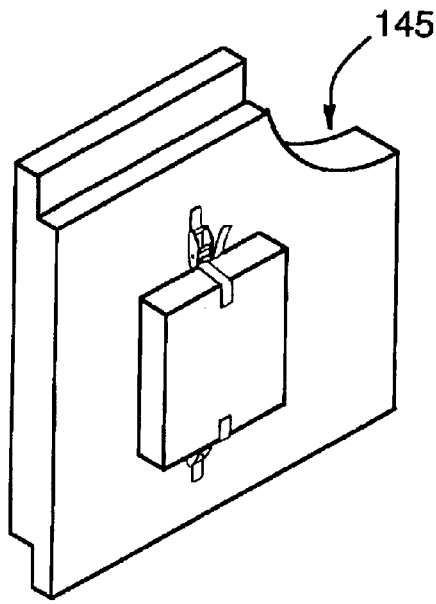
FIG. 45 is a perspective view of a blanket segment similar to the structure of FIG. 18.
Figure 46:
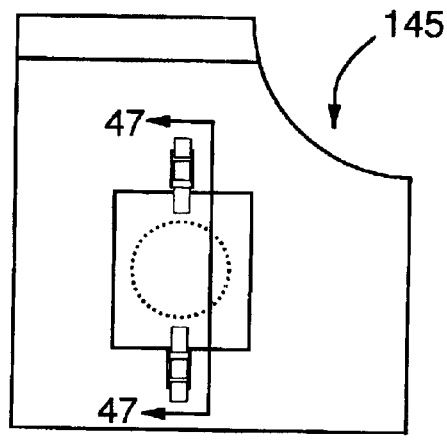
FIG. 46 is a front elevational view of the structure of FIG. 45.
Figure 47:
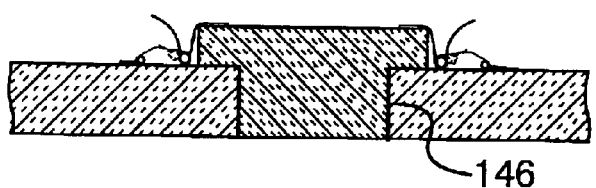
FIG. 47 is a partial cross-sectional view of the structure of FIG. 45, along section line 47—47 thereof.
Figure 48:
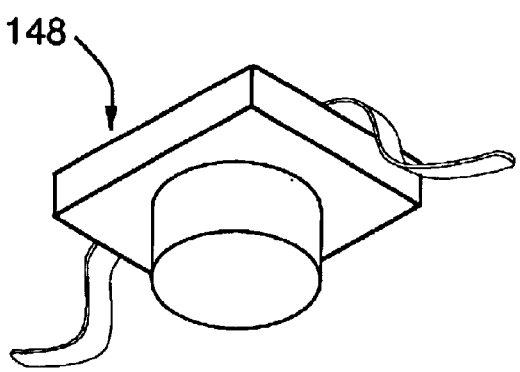
FIG. 48 is a perspective view of a portion of the structure of FIG. 45.

As well, the insulation blankets and other portions of the insulation system of the present invention will be customized in shape, as exemplified by the scalloped inset portion 145 shown in FIGS. 45,46, to accommodate piping or the like which protrudes through the housing.

As well, the insulation blankets of the present invention will be provided, as necessary, with access ports 146, and corresponding plug portions 148, adapted to be positioned, in use, in volume-filling relation to said access ports and in overlapping relation to the adjacent insulation blankets, as shown in FIGS. 45–48.

Additionally, whereas the blanket segments, first insulation rib segments, second insulation rib segments and insulation coupling members of the preferred embodiment of the present invention mate with one another in half-lap relation, it will evident that, with modification, other lapping relations, such as full overlap, or tongue and groove, may be accommodated.

Further, whereas the insulation blankets, first insulation ribs and second insulation ribs of the preferred embodiment are of segmented form, and provided with handles 144, to facilitate manipulation, it will be evident that this need not be the case.

Similarly, whereas the insulation coupling member of the preferred embodiment is strapped in use to both the first insulation rib and to the second insulation rib, it will be evident that this is not essential for securement. Indeed, the insulation coupling member may be formed integrally with one or more of the first insulation ribs or second insulation ribs, thereby obviating need for securement entirely.

Figure 41:
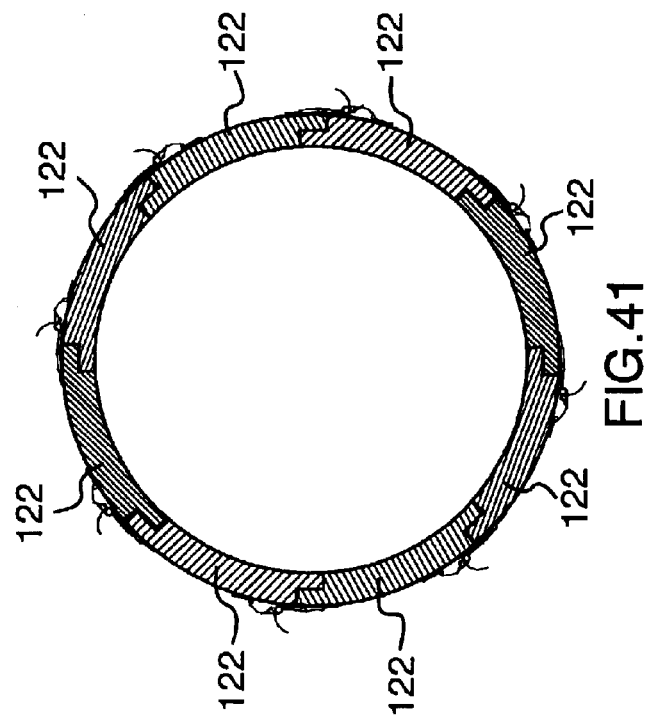
FIG. 41 is a cross-sectional view of the structure of FIG. 40, viewed along section line 41—41 thereof.
Figure 40:
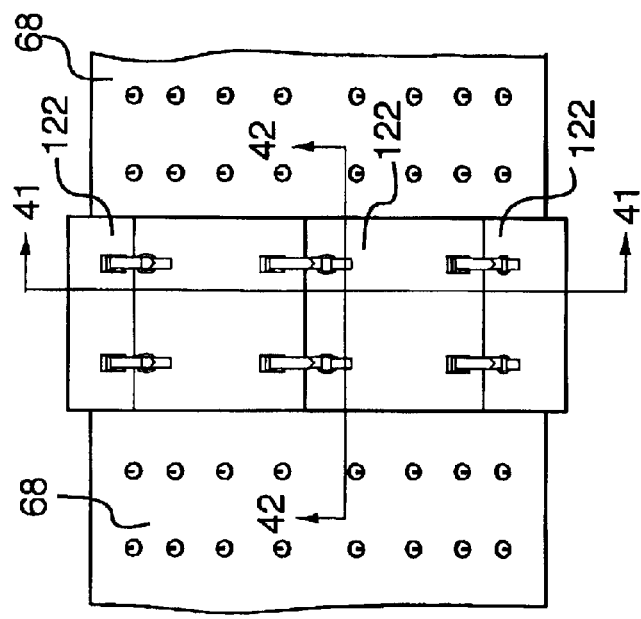
FIG. 40 is a side elevational view of an alternative embodiment of the insulation system of the present invention in use with a pipe.
Figure 42:
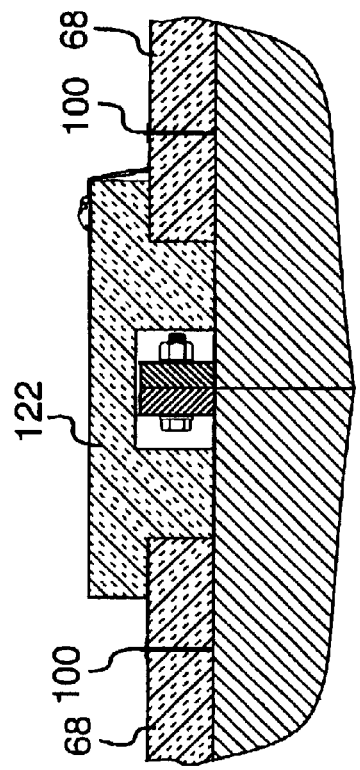
FIG. 42 is a cross-sectional view of the structure of FIG. 40, viewed along section line 42—42 thereof.
Figures 43, 44:
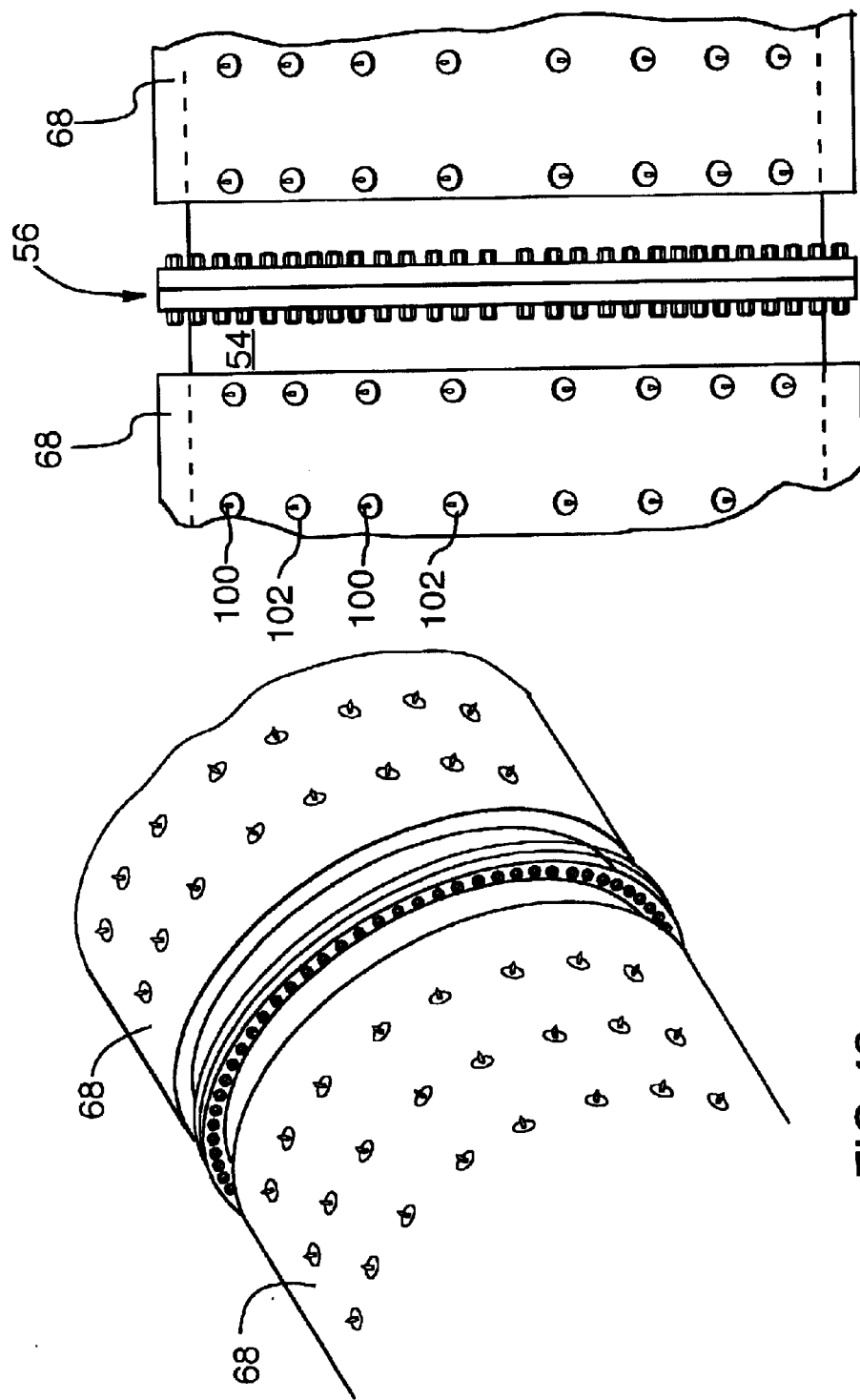
FIG. 43 is a perspective view of the structure of FIG. 40, with portions removed for clarity.
FIG. 44 is a side elevational view of the structure of FIG. 43.

As well, whereas the disclosure herein has been focused towards turbines, as this represents a commercial need of substantial magnitude, it should be understood that the present invention may be utilized in other application, such as piping, as disclosed in FIGS. 40–42.

In piping, for example, it will be uncommon for a longitudinal joint to be present. However, flange joints, joining pipe ends to one another, are very common, and in such circumstance, the insulation system of the present invention may be deployed substantially in the same manner as previously described, but without the need for the insulation coupling member of the preferred embodiment, as shown in FIGS. 40–42.

It will similarly be evident that the sequence of steps outlined in the preferred method described herein need not be strictly followed.

For example, for an installation, the insulation blankets need not be completely installed before work commences on the first insulation ribs and the second insulation ribs.

As well, whereas the illustrations depict work commencing contemporaneously on the first insulation ribs and the second insulation ribs, same could equally be installed in sequence, one after another.

Accordingly, it will be understood that the scope of the present invention is limited only by the accompanying claims, purposively construed.

I claim:

1. An insulation system for use with a turbine housing of the type having a tubular exterior surface centred about and defining a horizontal longitudinal axis, a vertical joint raised relative to the tubular exterior surface and dividing the housing into fore and aft tubular portions and a pair of horizontal joints raised relative to the tubular exterior surface and dividing the housing into upper and lower arcuate portions, said insulation system comprising:

four insulation blankets removably positioned, in use, at respective operative positions upon said tubular exterior surface, in spaced relation to the horizontal joints and to the vertical joint so as to define between one another, in combination with the tubular surface of the housing, an annular channel in which the vertical joint is positioned and a pair of longitudinal channels each intersecting the annular channel and having positioned therein a respective horizontal joint;

a pair of first insulation ribs for each longitudinal channel, said pair of first insulation ribs being removably positioned, in use, respectively, fore and aft of said vertical joint, in volume-filling relation to said each longitudinal channel, in straddling, close-fitting relation to the horizontal joint positioned in said each longitudinal channel and in overlapping relation to the insulation blankets disposed, respectively, on the fore and aft tubular portions of the housing;

a pair of second insulation ribs, said pair of second insulation ribs being removably positioned, in use, respectively, above and beneath the horizontal joints, in volume-filling relation to the annular channel, in straddling, close-fitting relation to the vertical joint, and in overlapping relation to the insulation blankets disposed, respectively, on the upper and lower arcuate portions of the housing; and an insulation coupling member for each longitudinal channel, said insulation coupling member being removably positioned, in use, in said each longitudinal channel at the intersection thereof with the annular channel, in volume-filling relation to a void defined by the housing, the first insulation ribs and the second insulation ribs, in straddling, close-fitting relation to the horizontal joint positioned in said each longitudinal channel and to the vertical joint, and in lapped relation to the first insulation ribs and the second insulation ribs.

2. An insulation system according to claim 1, wherein the insulation coupling member is positioned, in use, in overlapped relation to the first insulation ribs and the second insulation ribs.

3. An insulation system according to claim 2, wherein the void is defined by the housing, the first insulation ribs, the second insulation ribs and the insulation blankets.

4. An insulation system according to claim 3, wherein each first insulation rib comprises a plurality of first insulation rib segments arranged, in use, in half-lap relation to one another.

5. An insulation system according to claim 4, further comprising means for releasably securing each first insulation rib segment to the insulation blankets which it overlaps in use.

6. An insulation system according to claim 5, wherein the means for releasably securing each first insulation rib segment to the insulation blankets which it overlaps in use comprises a plurality of first rib securing loops, a first rib securing strap for each first rib securing loop, and a first rib securing clasp for each first rib securing strap, arranged such that, for each first insulation rib segment, at least one of said plurality of first rib securing loops is securely attached to the exterior surface of each of the insulation blankets which said each first insulation rib segment overlaps in use, the first rib securing straps for said first rib securing loops are securely attached to said each first insulation rib segment and extend therefrom, in use, downwardly through said first rib securing loops, and back to the first rib securing clasps provided therefor, which are securely attached to said each first insulation rib segment.

7. An insulation system according to claim 6, wherein each second insulation rib comprises a plurality of second insulation rib segments arranged, in use, in half-lap relation to one another.

8. An insulation system according to claim 7, further comprising means for releasably securing each second insulation rib segment to the insulation blankets which it overlaps in use.

9. An insulation system according to claim 8, wherein the means for releasably securing each second insulation rib segment to the insulation blankets which it overlaps in use comprises a plurality of second rib securing loops, a second rib securing strap for each second rib securing loop, and a second rib securing clasp for each second rib securing strap, arranged such that, for each second insulation rib segment, at least one of said plurality of second rib securing loops is securely attached to the exterior surface of each of the insulation blankets which said each second insulation rib segment overlaps in use, the second rib securing straps for said second rib securing loops are securely attached to said each second insulation rib segment and extend therefrom, in use, downwardly through said second rib securing loops, and back to the second rib securing clasps provided therefor, which are securely attached to said each second insulation rib segment.

10. An insulation system according to claim 9, wherein each insulation blanket comprises a plurality of blanket segments arranged, in use, in half-lap relation to one another.

11. An insulation system according to claim 10, further comprising means for releasably securing the plurality of blanket segments of each insulation blanket to one another in such arrangement in use.

12. An insulation system according to claim 11, wherein the means for releasably securing the plurality of blanket segments of each insulation blanket to one another in use comprises a plurality of loop, clasp and strap assemblies operably mounted to said blanket segments.

13. An insulation system according to claim 12, further comprising means for releasably securing the insulation blankets at their respective operative positions.

14. An insulation system according to claim 13, wherein the means for releasably securing the insulation blankets at their respective operative positions comprises a plurality of positioning members, each defining at least one positioning loop, a positioning strap for each positioning loop, and a positioning clasp for each positioning strap, arranged such that a pair of positioning members are securely mounted in use to the housing in circumferentially bracketing relation to said each insulation blanket, the positioning straps for the positioning loops defined by said positioning members are securely attached to said each insulation blanket and extend therefrom, downwardly through said positioning loops, and back to the positioning clasps provided therefor, which are securely attaced to said each insulation blanket, to urge the insulation blanket against the housing.

15. An insulation system according to claim 14, wherein the means for releasably securing the blanket segments at their respective operative positions further comprises:

a plurality of spikes secured, in use, to the lower arcuate portion of the housing and having impaled thereon the insulation blankets disposed on said lower arcuate portion; and a plurality of lock washers each seated, in use, on a respective spike in exteriorly abutting relation to said insulation blankets.

16. An insulation system according to claim 15, further comprising means for releasably securing each insulation coupling member to the first insulation ribs and second insulation ribs which it overlaps in use.

17. An insulation system according to claim 16, wherein the means for releasably securing each insulation coupling member to the first insulation ribs and the second insulation ribs which it overlaps in use comprises a plurality of coupler loops, a coupler strap for each coupler loop and a coupler clasp for each coupler strap, arranged such that, for each insulation coupler member, at least one of said plurality of coupler loops is securely attached to the exterior surface of each of said first insulation ribs and second insulation ribs, wherein the coupler straps for said coupler loops are securely attached to said each insulation coupling member and extend therefrom, in use, through said coupler loops and back to the coupler clasps provided therefor, which are securely attached to said each insulation coupling member, to urge the insulation coupling member against said first insulation ribs and second insulation ribs.

18. Method for insulating a turbine housing of the type having a tubular exterior surface centred about and defining a horizontal longitudinal axis, a vertical joint raised relative to the tubular exterior surface and dividing the housing into fore and aft tubular portions and a pair of horizontal joints raised relative to the tubular exterior surface and dividing the housing into upper and lower arcuate portions, said method comprising the steps of:

(a) providing the insulation system of claim 1;

(b) positioning the insulation blankets at their respective operative positions upon said tubular exterior surface in spaced relation to the horizontal joints and to the vertical joint so as to define between one another, in combination with the tubular surface of the housing, an annular channel in which the vertical joint is positioned and a pair of longitudinal channels each intersecting the annular channel and having positioned therein a respective horizontal joint;

(c) positioning, with respect to each longitudinal channel, the pair of first insulation ribs therefor, respectively, fore and aft of said vertical joint, in volume-filling relation to said each longitudinal channel, in straddling, close-fitting relation to the horizontal joint positioned in said each longitudinal channel and in overlapping relation to the insulation blankets disposed, respectively, on the fore and aft tubular portions of the housing;

(d) positioning said pair of second insulation ribs, respectively, above and beneath the horizontal joints, in volume-filling relation within the annular channel, in straddling, close-fitting relation to the vertical joint, and in overlapping relation to the insulation blankets disposed, respectively, on the upper and lower arcuate portions of the housing; and (e) positioning the pair of insulation coupling members, respectively, in each longitudinal channel, at the intersection thereof with the annular channel, in volume-filling relation to a void defined by the housing, the first insulation ribs and the second insulation ribs, in straddling, close-fitting relation to the horizontal joint positioned in said each longitudinal channel and to the vertical joint, and in lapped relation to the first insulation ribs and the second insulation ribs.

19. Method for insulating a turbine housing of the type having a tubular exterior surface centred about and defining a horizontal longitudinal axis, a vertical joint raised relative to the tubular exterior surface and dividing the housing into fore and aft tubular portions and a pair of horizontal joints raised relative to the tubular exterior surface and dividing the housing into upper and lower arcuate portions, said method comprising the steps of:

(a) providing the insulation system of claim 17;

(b) positioning the insulation blankets at their respective operative positions upon said tubular exterior surface in spaced relation to the horizontal joints and to the vertical joint so as to define between one another, in combination with the tubular surface of the housing, an annular channel in which the vertical joint is positioned and a pair of longitudinal channels each intersecting the annular channel and having positioned therein a respective horizontal joint;

(c) positioning, with respect to each longitudinal channel, the pair of first insulation ribs therefor, respectively, fore and aft of said vertical joint, in volume-filling relation to said each longitudinal channel, in straddling, close-fitting relation to the horizontal joint positioned in said each longitudinal channel and in overlapping relation to the insulation blankets disposed, respectively, on the fore and aft tubular portions of the housing;

(d) positioning said pair of second insulation ribs, respectively, above and beneath the horizontal joints, in volume-filling relation within the annular channel, in straddling, close-fitting relation to the vertical joint, and in overlapping relation to the insulation blankets disposed, respectively, on the upper and lower arcuate portions of the housing; and (e) positioning the pair of insulation coupling members, respectively, in each longitudinal channel, at the intersection thereof with the annular channel, in plugged relation to a void defined by the housing, the first insulation ribs, the second insulation ribs and the insulation blankets, in straddling, close-fitting relation to the horizontal joint positioned in said each longitudinal channel and to the vertical joint, and in overlapped relation to the first insulation ribs and the second insulation ribs.

20. A method according to claim 19, further comprising the step (b) (1) of releasably securing the insulation blankets at their respective operative positions, said step comprising, for each insulation blanket, the substeps of:

(i) securely mounting the pair of positioning members for said each insulation blanket to the housing by welding;

(ii) threading the positioning straps secured to said each insulation blanket through respective positioning loops of said pair of positioning members, and drawing said positioning straps through a respective positioning clasp to urge said each insulation blanket against the housing.

21. A method according to claim 20, wherein step (b) (1) further comprises, substep (iii) securing the plurality of spikes to the lower arcuate portion of the housing by welding;

and, for the insulation blankets disposed on the lower arcuate portion, substeps:

(iv) impaling said insulation blankets on said plurality of spikes; and (v) seating each lock washer on a respective spike in exteriorly abutting relation to said insulation blankets.

22. A method according to claim 21, wherein step (b) (1) further comprises the substeps, for each insulation blanket, of:

(vi) positioning each of the insulation blanket segments which form said each insulation blanket one after another on the housing in half-lap relation to adjacent insulation blanket segments; and (vii) securing each insulation blanket segment to adjacent insulation blanket segments by the loop, strap and clasp assemblies.

23. A method according to claim 19, wherein step (c) comprises the steps, for each first insulation rib, of:

(c)(i) positioning each of the first insulation rib segments which form the same in seriatim in volume-filling relation to said each longitudinal channel, in straddling, close-fitting relation to the horizontal joint contained by said each longitudinal channel, in overlapping relation to the adjacent insulation blankets, and in half-lap relation to adjacent first insulating rib segments; and (c)(ii) threading the first rib securing straps secured to said each first insulation rib segment through a respective first rib securing loop on the insulation blanket which it overlaps, and drawing said first rib securing strap through a respective clasp to urge said each first rib insulation segment against said insulation blanket.

24. A method according to claim 19, wherein step (d) comprises the steps, for each second insulation rib, of:

(d)(i) positioning each of the second insulation rib segments which form the same one after another in volume-filling relation to said each longitudinal channel, in straddling, close-fitting relation to the horizontal joint positioned in said each longitudinal channel, in overlapping relation to the adjacent insulation blankets, and in half-lap relation to adjacent second insulating rib segments; and (d)(ii) threading the second rib securing straps secured to said each second insulation rib segment through a respective second rib securing loop on the insulation blanket which it overlaps, and drawing said second rib securing strap through a respective second rib securing clasp to urge said each second insulation rib segment against said insulation blanket.

* * * * *